US008098289B2

(12) United States Patent
Chiou et al.

(10) Patent No.: US 8,098,289 B2
(45) Date of Patent: Jan. 17, 2012

(54) MICRO-OPTICAL IMAGE STABILIZER

(75) Inventors: Jin-Chern Chiou, Hsinchu (TW); Yung-Jiun Lin, Miaoli County (TW); Tzu-Kan Chen, Taipei (TW); Meng-Hsin Kuo, Taipei County (TW); Cheng-Te Tseng, Taipei (TW); Chia-Hsi Tsai, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 8 days.

(21) Appl. No.: 12/435,418

(22) Filed: May 5, 2009

(65) Prior Publication Data

US 2009/0213236 A1 Aug. 27, 2009

Related U.S. Application Data

(63) Continuation-in-part of application No. 11/780,483, filed on Jul. 20, 2007.

(30) Foreign Application Priority Data

May 2, 2007 (TW) .............................. 96207004 U

(51) Int. Cl.
*H04N 5/228* (2006.01)

(52) U.S. Cl. ................. 348/208.7; 348/208.99; 348/374

(58) Field of Classification Search ............. 348/208.11, 348/208.99, 208.4, 208.7, 373–376, 218.1; 359/557

See application file for complete search history.

(56) References Cited

U.S. PATENT DOCUMENTS 6,676,416 B1 * 1/2004 Ellis et al. ....................... 439/65
2006/0092514 A1 5/2006 Koo et al.
2009/0213236 A1 * 8/2009 Chiou et al. ............. 348/208.11

* cited by examiner

*Primary Examiner* — David Ometz
*Assistant Examiner* — Antoinette Spinks
(74) *Attorney, Agent, or Firm* — Li & Cai Intellectual Property (USA) Office

(57) ABSTRACT

The optical image stabilizer includes a substrate, a carrier movably disposed above the substrate for carrying an image sensor, an anchor fixed above the substrate, a conducting pad fixed above the anchor for coupling an image processing circuit, a flexible suspension disposed between the conducting pad and the carrier, a conducting line disposed above the flexible suspension coupled to the conducting pad and protruding over the carrier for coupling the image sensor, and a micro-actuator disposed between the substrate and the carrier for adjusting the position of the carrier according to control signals from an actuator control circuit.

20 Claims, 20 Drawing Sheets

Fixed element

Moveable element

Bend-able element

Glue layer

Metal

MICRO-OPTICAL IMAGE STABILIZER

CROSS REFERENCE TO RELATED APPLICATIONS

This is a continuation-in-part of U.S. patent application Ser. No. 11/780,483 filed Jul. 20, 2007.

BACKGROUND OF THE INVENTION

1. Field of the Invention

The present invention relates to an image stabilizer, and more particularly, to a micro-optical image stabilizer.

2. Description of the Prior Art

Nowadays many digital cameras emphasize on the stabilization function. One of the stabilization methods involves equipping the image sensor (such as CCD and CMOS) with an image stabilizer so as to stabilize the captured image when the image sensor is not stable. However, as the digital camera is getting smaller, the size of the image stabilizer is also getting smaller. Hence, it is proposed with the image stabilizer utilizing Micro-Electro-Mechanical System (MEMS) techniques in the prior art.

Please refer to FIG. 1. FIG. 1 is a diagram illustrating an image stabilizer 100 of MEMS. The image stabilizer 100 comprises an image processing circuit 110, an actuator control circuit 120, 4 sets of electrostatic actuators 131-134, a substrate 170, a carrier 150, an image sensor 160, and a flexible printed circuit 140. The image sensor 160 comprises an image sensing area 161. The actuator control circuit 120 is coupled to the electrostatic actuators 131-134 for controlling the movements of the electrostatic actuators 131-134. One end of each of the electrostatic actuators 131-134 is fixed above the substrate 170 and the other end of each of the electrostatic actuators 131-134 is fixed to the carrier 150. The distance between the two ends of each of the electrostatic actuators 131-134 is controlled by the actuator control circuit 120. Consequently, the position of the carrier relative to the substrate is controlled by the actuator control circuit 120. Take the electrostatic actuator 133 for example, the electrostatic actuator 133 comprises a fixed component 133*a* and a moveable component 133*b*. The fixed component 133*a* is fixed above the substrate 170 and the moveable component 133*b* is fixed to one side of the carrier 150 (as shown in FIG. 1). The distance between the fixed component 133*a* and the moveable component 133*b* is controlled by the actuator control circuit 120. For example, the higher the control voltage of the actuator control circuit 120 transmitted to the electrostatic actuator 133, the closer between the fixed component 133*a* and the moveable component 133*b*, and vice versa. Thus, the distance D is controlled by the actuator control circuit 120. The other 3 sets of the electrostatic actuators 131, 132, and 134 are also controlled in the same manner. In this way, the actuator control circuit 120 respectively controls the electrostatic actuators 131-134 for moving the carrier 150 relative to the substrate 170. The image sensor 160 is fixed above the carrier 150 but not electrically coupled to the carrier 150. Therefore, the image sensor 160 moves as the carrier 150. The image sensing area 161 is disposed for sensing optical signals of an image, which means the image sensing area 161 senses the image, and accordingly generating electrical signals. The image processing circuit 110 is coupled to the image sensor 160 through the flexible printed circuit 140 for receiving the electrical signals from the image sensor 160 and accordingly generating digital signals of the image. Thus, when the substrate 170 is moving, the actuator control circuit 120 transmits control signals to the electrostatic actuators 131-134 so as to move the carrier 150 in the opposite direction. Thus, the movement of the substrate 170 does not affect the image sensor 160 and the captured images are stabilized.

Please refer to FIG. 2. FIG. 2 is a diagram illustrating the fabrication of the conventional image stabilizer 100. As shown in FIG. 2, after the electrostatic actuators 131-134 and the carrier 150 are fabricated onto the substrate 170, the image sensor 160 is attached onto the carrier 150, and then the flexible printed circuit 140 is electrically and mechanically coupled to the image sensor 160. The image sensor 160 is equipped with a plurality of conducting pads 162 and the flexible printed circuit 140 is correspondingly equipped with a plurality of pins 141. In fabrication, the conducting pads 162 is applied with tin paste, then the flexible printed circuit 140 is fixed above the conducting pad 162 with glue, and the combination of the flexible printed circuit 140 and the image sensor 160 are heated so as to couple the pin 141 of the flexible printed circuit 140 onto the conducting pad 162 of the image sensor 160.

It is known from the above that the conventional image stabilizer 100 needs two steps for fabrication of the image sensor: 1. glue the image sensor 160 onto the carrier 150, and 2. couple the flexible printed circuit 140 onto the image sensor 160. The two steps are complicated for production, which is inconvenient.

Furthermore, in the conventional image stabilizer 100, because the flexible printed circuit 140 is electrically and mechanically coupled to the image sensor 160, when the movement of the carrier 150 relative to the substrate 170 is generated, the presence of the flexible printed circuit 140 interferes with the movement. For example, the flexible printed circuit 140 generates force onto the carrier 150 when the flexible printed circuit 140 is squeezed or pulled, which interferes the movement of the carrier 150. Besides, it is unknown of the force generated by the flexible printed circuit 140. Therefore, the position of the carrier 150 is also affected by the flexible printed circuit 140, which is different from the ideal position.

SUMMARY OF THE INVENTION

The present invention provides a micro-optical image stabilizer for stabilizing an image sensed by an image sensor. The micro-optical image stabilizer comprises a substrate, a carrier moveably disposed on the substrate for carrying the image sensor, a first anchor fixed on the substrate, a first conducting pad fixed on the first anchor for coupling an image processing circuit, a flexible suspension disposed on the first anchor, a connecting arm connecting the flexible suspension, a second conducting pad for coupling the image sensor for receiving an electrical signal from the image sensor, a conducting line disposed on the flexible suspension, and a micro-actuator coupled to an actuator control circuit for adjusting a position of the carrier relative to the substrate according to control signals transmitted from the actuator control circuit. The conducting line comprises a first end coupled to the first conducting pad, and a second end coupled to the second conducting pad.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
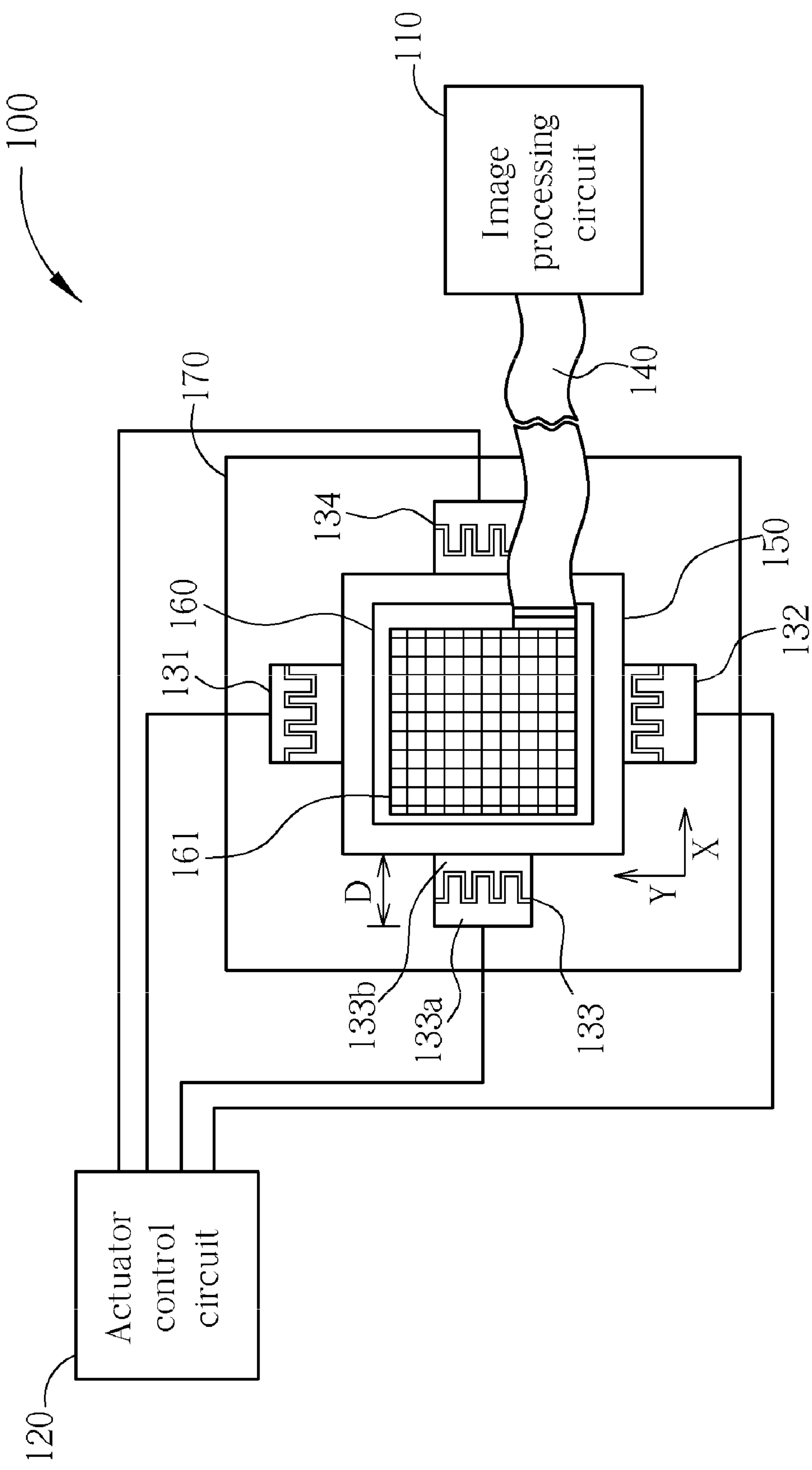
FIG. 1 is a diagram illustrating an image stabilizer of MEMS.
Figure 2:
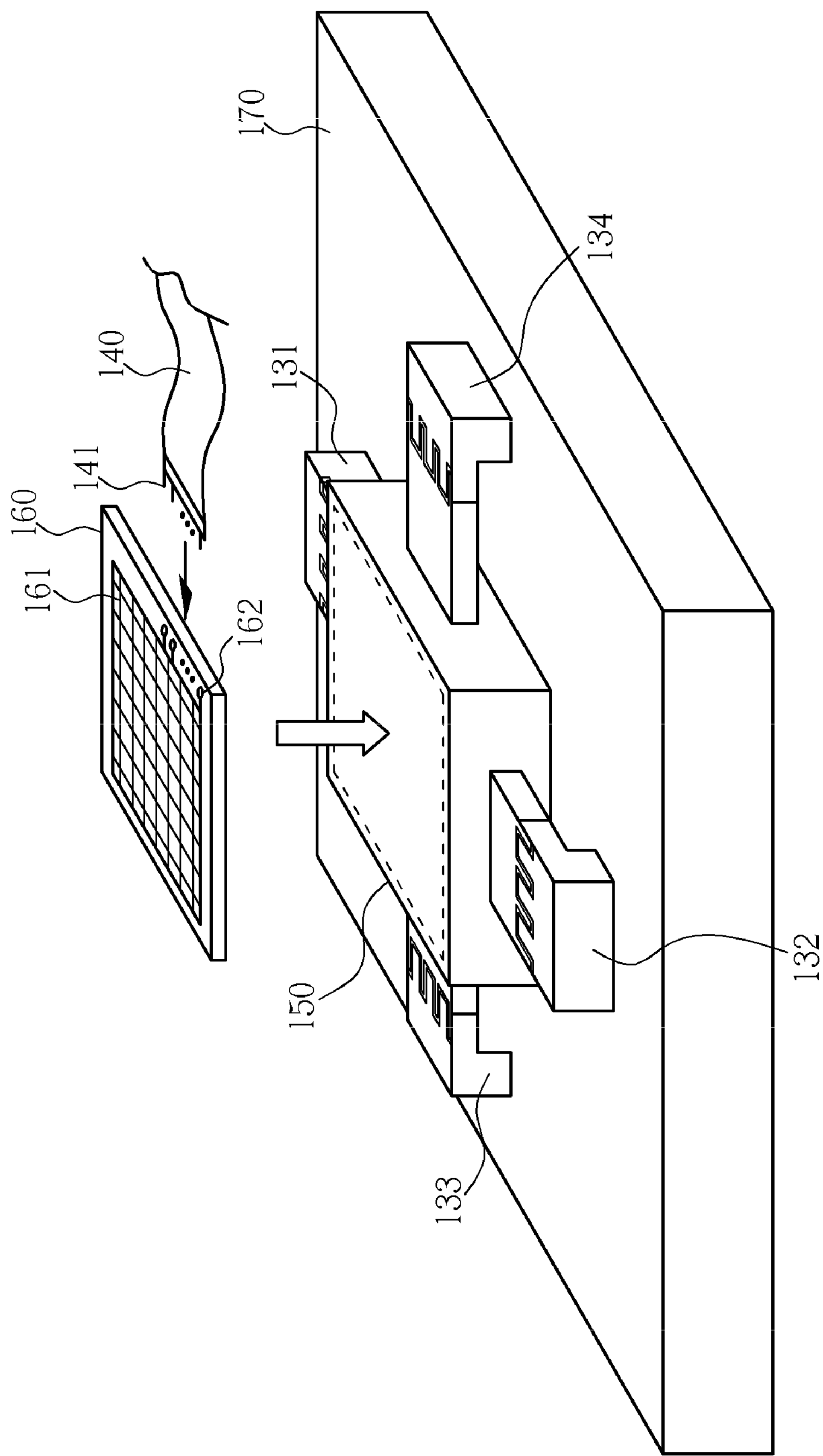
FIG. 2 is a diagram illustrating the fabrication of the conventional image stabilizer.
Figure 3:
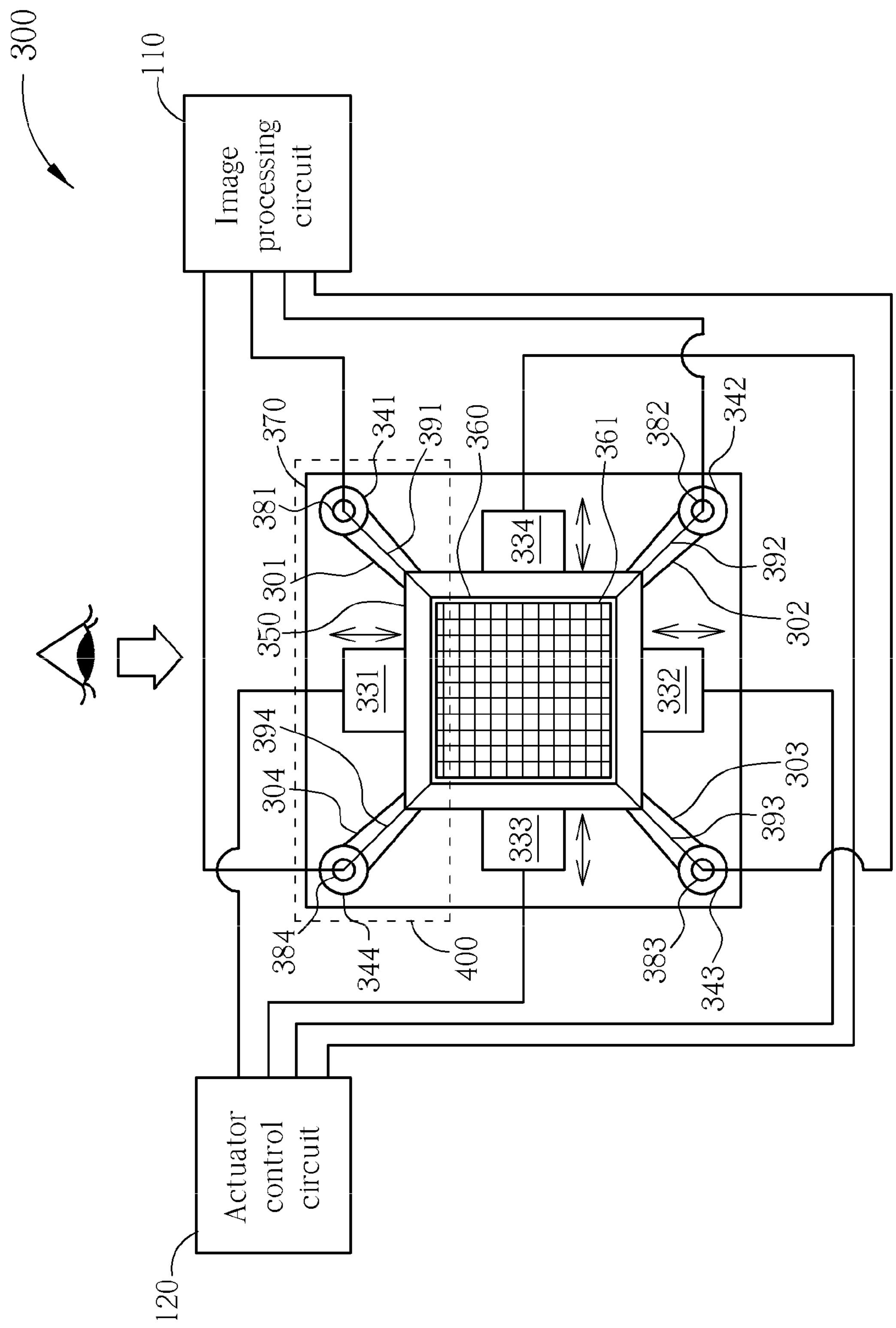
FIG. 3 is a diagram illustrating a first embodiment according to the micro-optical image stabilizer of the present invention.

Please refer to FIG. 3. FIG. 3 is a diagram illustrating a first embodiment according to the micro-optical image stabilizer 300 of the present invention. As shown in FIG. 3, the image stabilizer 300 comprises an image processing circuit 110, an actuator control circuit 120, 4 sets of actuators 331-334, a substrate 370, a carrier 350, an image sensor 360, 4 anchors 341-344, 4 conducting pads 381-384, 4 conducting lines 391-394, 4 conducting pads 3811-3844 (not shown), and 4 flexible suspensions 301-304. The image sensor 360 comprises an image sensing area 361. The actuator control circuit 120 is coupled to the actuators 331-334 for controlling the movement of the actuators 331-334. One end of each of the actuators 331-334 is fixed above the substrate 370 and the other end of each of the actuators 331-334 is fixed to the carrier 350. In this way, the actuator control circuit 120 respectively controls the actuators 331-334 so as to move the position of the carrier 350 relative to the substrate 370 in the X direction or the Y direction. The anchors 341-344 are fixed above the substrate 370. The conducting pads 381-384 are respectively fixed above the anchors 341-344. The flexible suspensions 301-304 are respectively coupled between the anchors 341-344 and the carrier 350 for stabilizing the carrier 350 at a default position when the actuators 331-334 do not move and carrying the conducting lines 391-394. One end of each of the conducting lines 391-394 is coupled to the a corresponding conducting pad of the conducting pads 381-384 and the other end of each of the conducting lines 391-394 is protruding over the carrier 350 and fixed above the carrier 350 (not electrically coupled). The conducting pads 3811-3844 are respectively coupled to the conducting lines 391-394 and fixed above the carrier 350 (not electrically coupled). The image sensor 360 is fixed above the carrier 350 but not electrically coupled to the carrier 350. The image sensor 360 is coupled to the conducting pads 391-394 through the conducting pads 3811-3844 by wire bonding or flip chip bonding. In this way, the image sensor 360 moves as the carrier 350 moves. The image sensing area 361 is disposed for receiving optical signals of an image, which means the image sensing area 361 senses the image, and accordingly generating electrical signals. The image processing circuit 110 is coupled to the conducting pads 381-384 so that the image processing circuit 110 receives the electrical signals of the image sensing area 361 through the conducting pads 381-384, the conducting lines 391-394, and the conducting pads 3811-3844. Therefore, when the substrate 370 is shaken, the actuator control circuit 120 transmits control signals to the actuator 331-334 so as to make movement of the carrier 350 for eliminating effect of the substrate shaking to the image sensor 360. Thus, when the substrate 370 is shaken, the image sensor 360 is not affected by the substrate shaking and the received image is stable. Consequently, the image processing circuit 110 generates a stable image. Additionally, FIG. 3 is only illustrated as an exemplary embodiment, and those skilled in the art can modify the present embodiment according to their requirement, e.g. the positions and amounts of the anchors, conducting pads, conducting lines, and the flexible suspensions, can be modified as desired.

Figure 4:
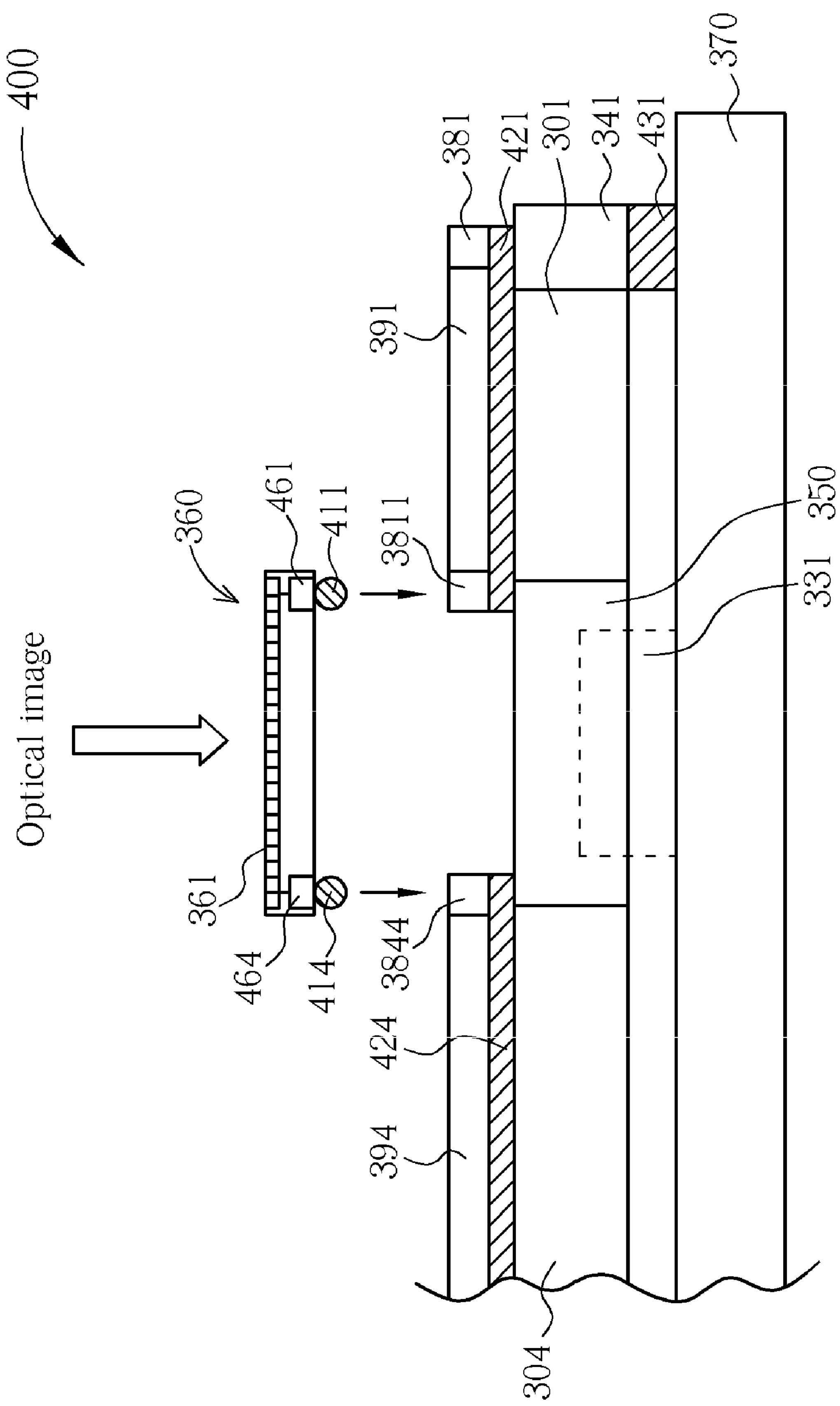
FIG. 4 is a diagram illustrating a cross-section of the image stabilizer of the present invention fabricated by flip chip bonding.

Please refer to FIG. 4. FIG. 4 is a diagram illustrating a cross-section of the image stabilizer 300 of the present invention fabricated by flip chip bonding. In FIG. 4, the cross-section is set along the line from the anchors 381 to 384 (as the indication 400 in FIG. 3). However, for brevity, the actuator 331 is not shown in FIG. 4 (only depicted as the dotted lines). In FIG. 4, in fact, the anchor 341 is fixed above the substrate 370 through an insulation layer 431 so as to ensure the insulation between the anchor 341 and the substrate 370. The flexible suspension 301 is coupled between the carrier 350 and the anchor 341, as shown in FIG. 4. The conducting pads 381 and 3811, and the conducting line 391 are respectively fixed above the carrier 350 and the flexible suspension 301 through the insulation layer 421 so as to ensure insulation between the conducting pads 381, 3811 and the carrier 350 and the anchor 341, and between the conducting line 391 and the suspension 301. The image sensor 360 is further equipped with conducting pads 461 and 464 on the opposite side to the image sensing area 361 for coupling to the conducting lines 391 and 394. The conducting pads 461 and 464 of the image sensor 360 are respectively coupled to the conducting lines 391 and 394 by the flip chip bonding. The flip chip technology comprises many methods for bonding, which is well known by those skilled in the art, and is omitted. The present invention only take one embodiment for example: 1. The conducting pads 461 and 464 are respectively glued with tin balls 411 and 414; 2. The conducting pads 461 and 464 are further respectively coupled to the image sensing area 361; and 3. The image sensor 360 is put onto the precise position of the carrier 350, and then is heated. In this way, the tin balls 411 and 414 are melted so that the conducting pad 461 and the conducting line 391 are coupled and the conducting pad 464 and the conducting line 394 are coupled. Consequently, the image processing circuit 110, after the fabrication of the image sensor 360 above the carrier 350, receives the electrical signals from the image sensor 360 through the conducting pad 381, the conducting line 391, the conducting pad 3811, the conducting pad 461, and the image sensing area 361.

Figure 12:
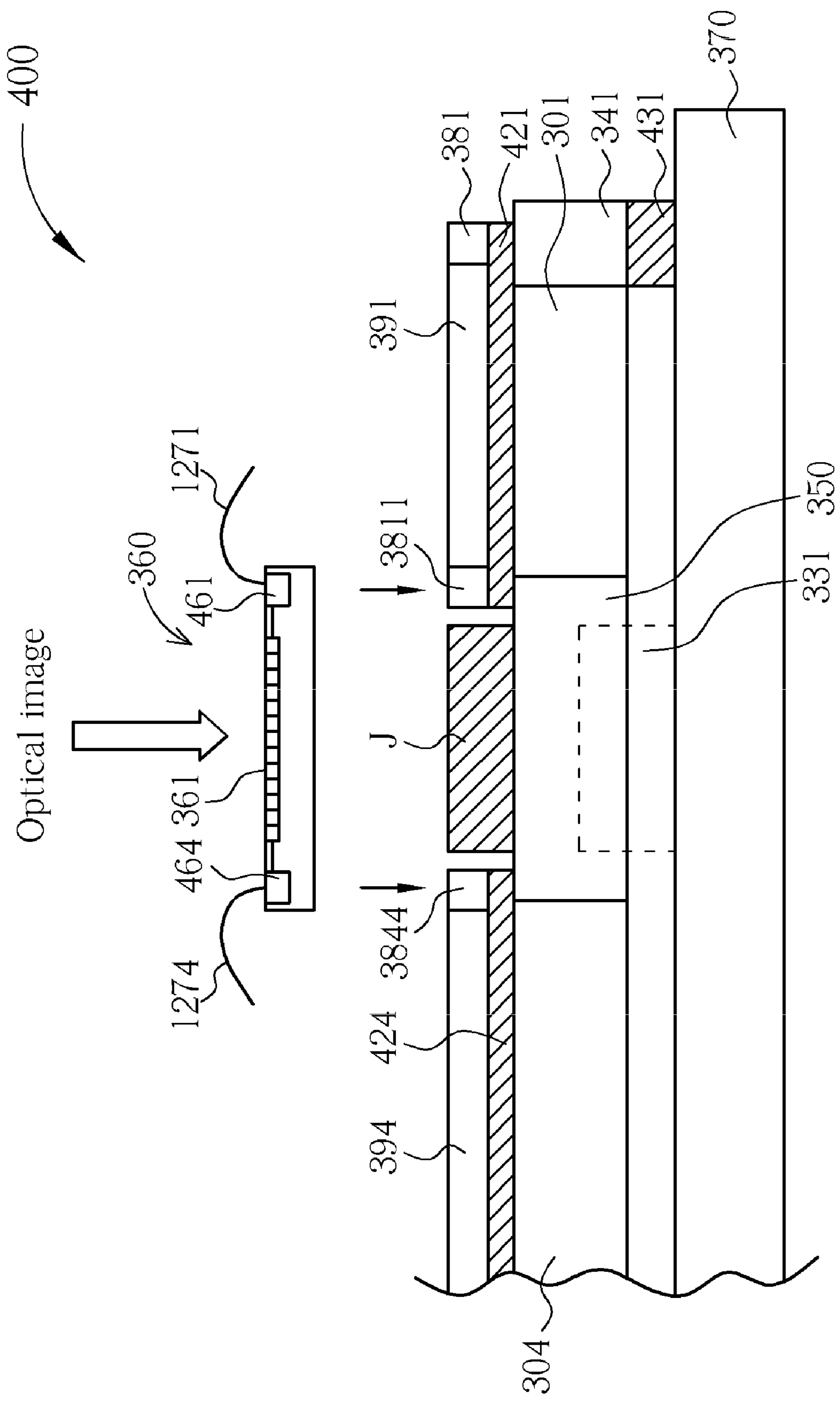
FIG. 12 is a diagram illustrating the first embodiment of the image stabilizer of the present invention fabricated by wire bonding.

Please refer to FIG. 12. FIG. 12 is a diagram illustrating the first embodiment of the image stabilizer 300 of the present invention fabricated by wire bonding. The cross-section shown in FIG. 12 is along the line from the anchor 381 to 384 (as the indication 400 shown in FIG. 3). For brevity, the actuator 331 is shown by dotted lines. In FIG. 12, the anchor 341 is fixed above the substrate 370 through an insulation layer 431 for ensuring insulation. The flexible suspension 301 is coupled between the carrier 350 and the anchor 341. The conducting pads 381, 3811, and the conducting line 391 are fixed above the flexible suspension 301 and the carrier 350 through an insulation layer 421 for ensuring insulation. The image sensor 360 is equipped with conducting pads 461 and 464 around the image sensing area 361 for coupling to the conducting lines 391 and 394. The conducting lines 1271 and 1274 are coupled to the conducting pads 3811 and 3844 by wire bonding. The wire bonding technology comprises many methods, which is well known by the skilled in the art, and is omitted. The present invention only takes one example: 1. The conducting pads 461 and 464 are respectively coupled to the conducting lines 1271 and 1274 by wire bonding; and 2. The conducting lines 1271 and 1274 are further coupled to the conducting pads 3811 and 3844. In this way, the image processing circuit 110, after the fabrication of the image sensor 360, receives the electrical signals of the image sensor 360 from the image sensor 360 through the conducting pad 381, the conducting line 391, the conducting pad 3811, the conducting line 1271, the conducting pad 461, and the image sensing area 361. Additionally, the carrier 350 is also equipped with nonconductive glue J for gluing the image sensor 360.

Figure 5:
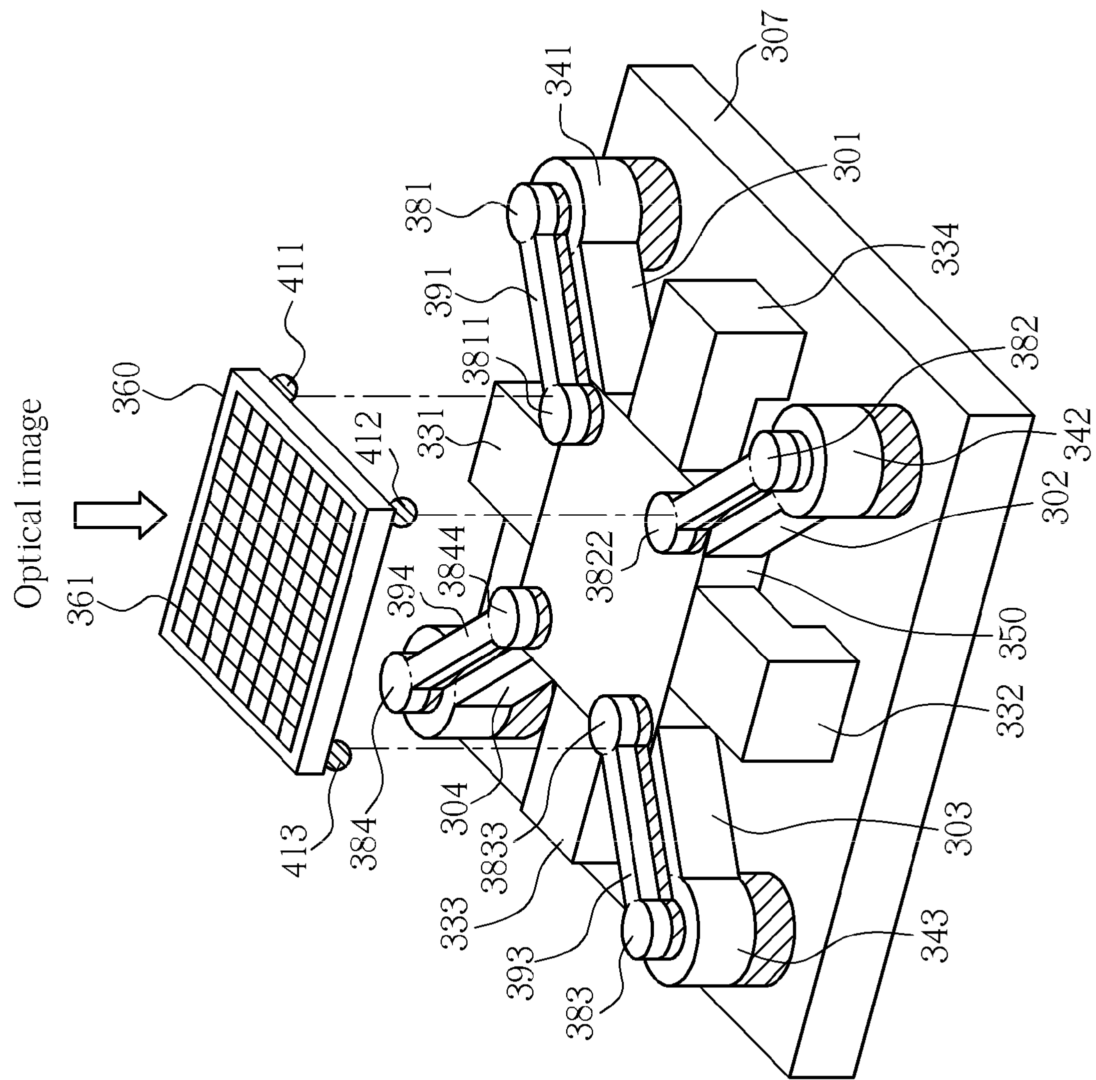
FIG. 5 is a diagram illustrating the first embodiment of the image stabilizer of the present invention fabricated by flip chip bonding.

Please refer to FIG. 5. FIG. 5 is a diagram illustrating the first embodiment of the image stabilizer 300 of the present invention fabricated by flip chip bonding. The flip chip technology comprises many methods, which is well known by those skilled in the art, and is omitted. The present invention takes only one for example: 1. The image sensor 360 is attached with tin balls 411-414; and 2. The image sensor 360 is put to the precise position and then is heated. Thus, the fabrication is completed. The fabrication of the present invention is much easier, which increases convenience.

Figure 13:
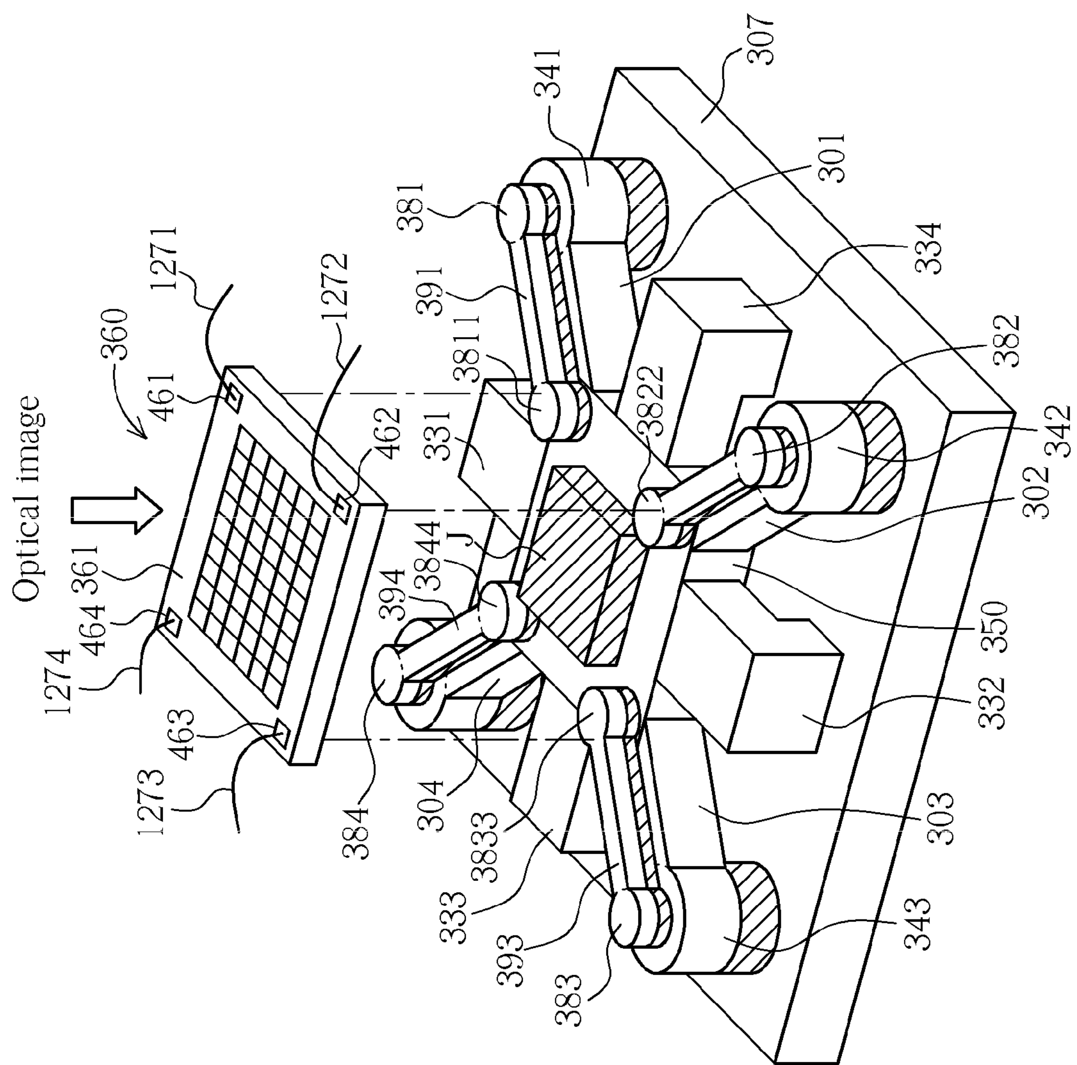
FIG. 13 is a diagram illustrating the first embodiment of the image stabilizer of the present invention fabricated by wire bonding.

Please refer to FIG. 13. FIG. 13 is a diagram illustrating the first embodiment of the image stabilizer 300 of the present invention fabricated by wire bonding. As shown in FIG. 13, the present invention utilizes wire bonding technology to fabricate the image sensor 360, which is much easier and increases convenience.

Figure 6:
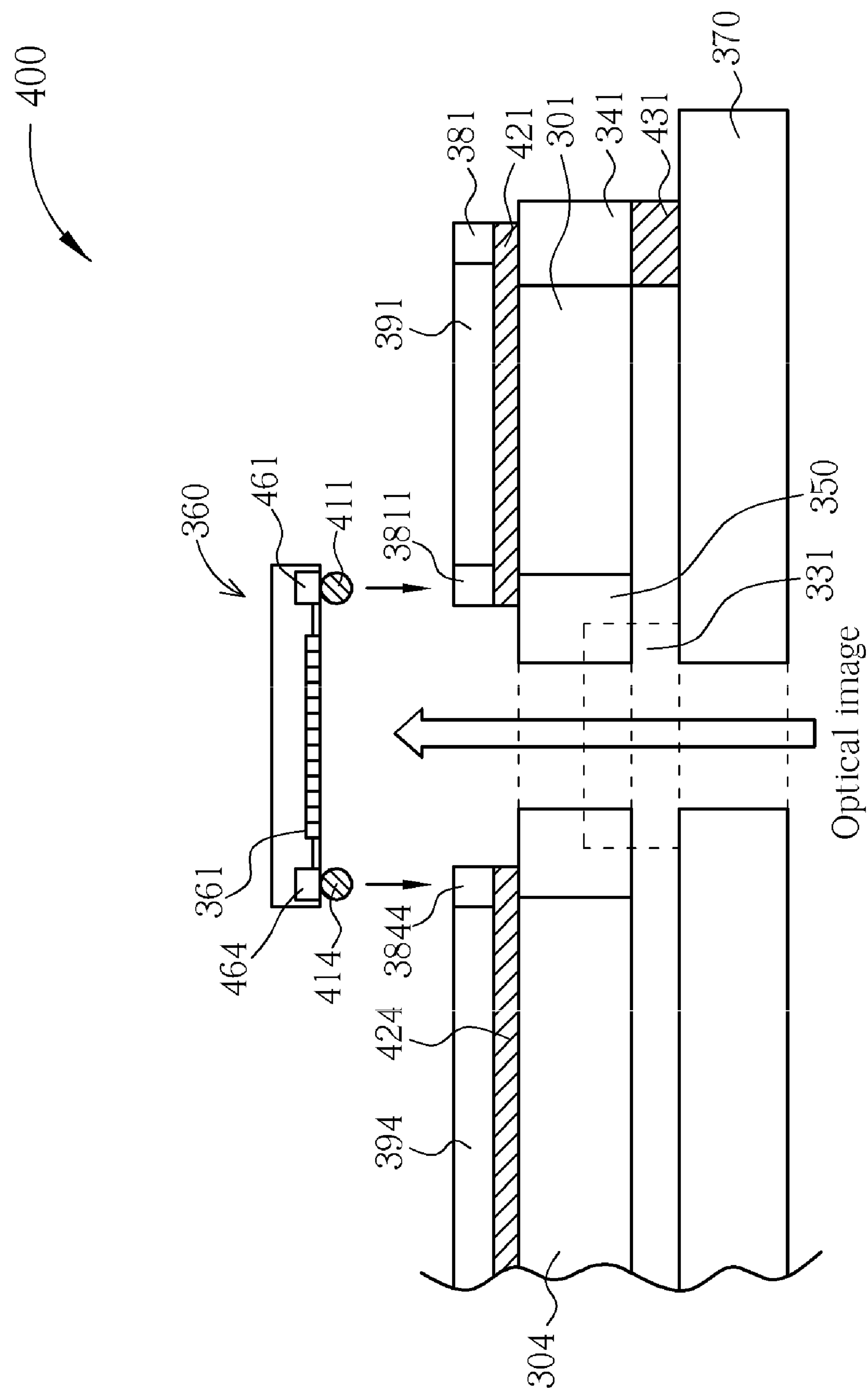
FIG. 6 is a diagram illustrating the cross-section of the second embodiment of the image stabilizer of the present invention fabricated by flip chip bonding.

Please refer to FIG. 6. FIG. 6 is a diagram illustrating the cross-section of the second embodiment of the image stabilizer 300 of the present invention fabricated by flip chip bonding. FIG. 6 is similar to FIG. 4 and the difference is: in FIG. 6, the image sensing area 361 is set between the image sensor 360 and the substrate 370. Consequently, the carrier 350 and the substrate 370 have to be accordingly disposed with holes to provide optical paths for the optical images. Thus, the optical images form on the image sensing area 361 through the substrate 370. Therefore, according to FIG. 4 and FIG. 6, users have two choices to design the image sensor 360 and the image sensing area 361, which further increases convenience.

Figure 14:
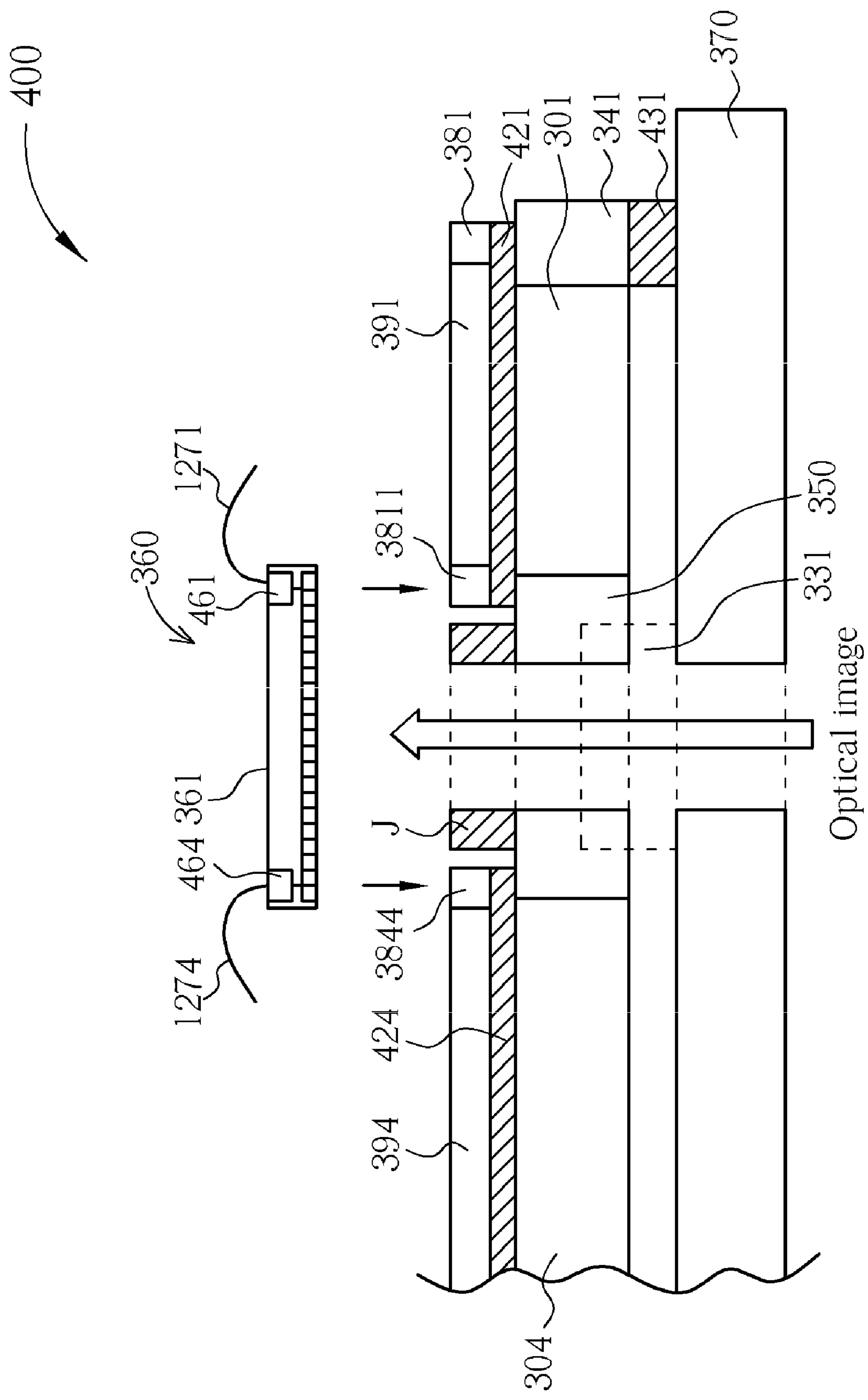
FIG. 14 is a diagram illustrating the second embodiment of the image stabilizer of the present invention fabricated by wire bonding.

Please refer to FIG. 14. FIG. 14 is a diagram illustrating the second embodiment of the image stabilizer 300 of the present invention fabricated by wire bonding. FIG. 14 is similar to FIG. 12 and the difference is: in FIG. 14, the image sensing area 361 is set between the image sensor 360 and the substrate 370. The related fabrication of FIG. 14 is same as FIG. 12, which is omitted. Therefore, the substrate 370 and the carrier 350 have to be equipped with holes accordingly to provide optical paths for optical signals of the image. In this way, the optical signals of the image form on the image sensing area 361 through the substrate 370.

Figure 7:
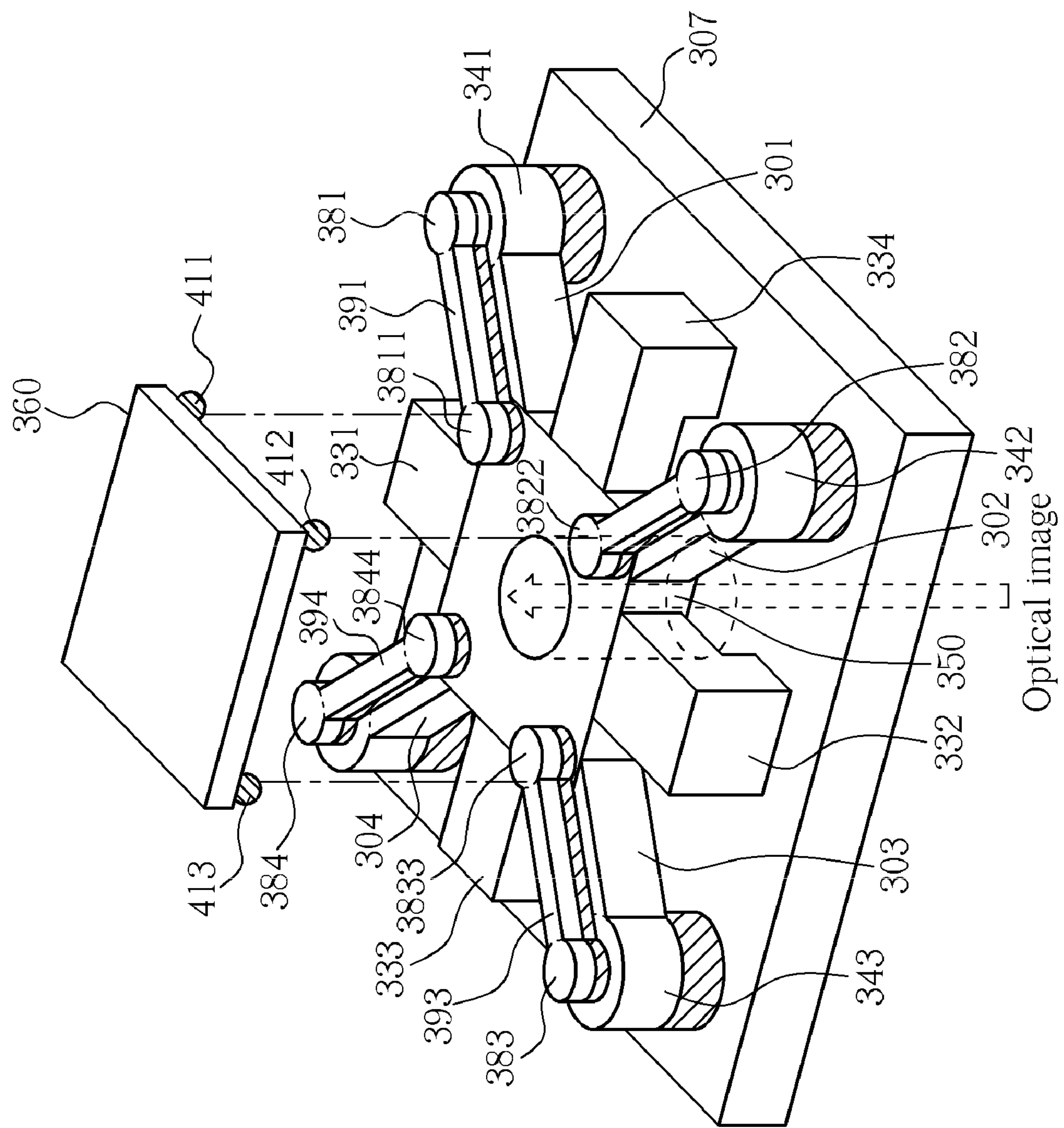
FIG. 7 is a diagram illustrating the second embodiment of the image stabilizer of the present invention fabricated by flip chip bonding.

Please refer to FIG. 7. FIG. 7 is a diagram illustrating the second embodiment of the image stabilizer 300 of the present invention fabricated by flip chip bonding. As shown in FIG. 7, the fabrication of the image stabilizer 300 of the present invention can be executed with the following steps: 1. The image sensor 360 is attached with tin balls 411-414; and 2. The image sensor 360 is put to the precise position and is heated. In this way, the fabrication is completed. The fabrication of the image stabilizer 300 of the present invention is much easier, which increases convenience since only the flip chip technology is needed to complete fixing of the image sensor 360 above the carrier 350 and simultaneously coupling of the image sensor 360 and all the conducting lines.

Figure 15:
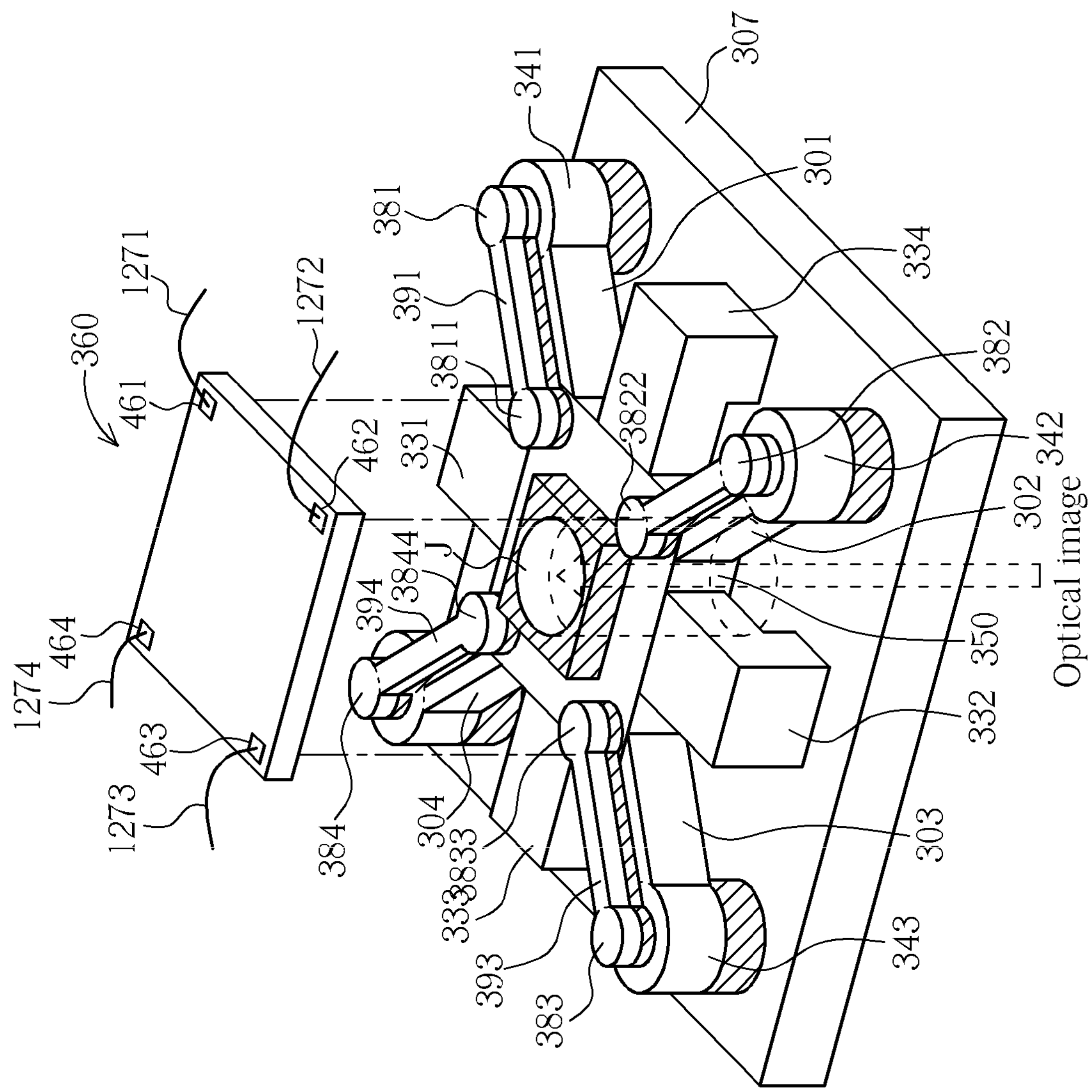
FIG. 15 is a diagram illustrating the second embodiment of the image stabilizer of the present invention fabricated by wire bonding.

Please refer to FIG. 15. FIG. 15 is a diagram illustrating the second embodiment of the image stabilizer 300 of the present invention fabricated by wire bonding. As shown in FIG. 15, the fabrication of the image stabilizer 300 of the present invention can be executed with wire bonding technology, which is much easier and increases convenience.

Figure 8:
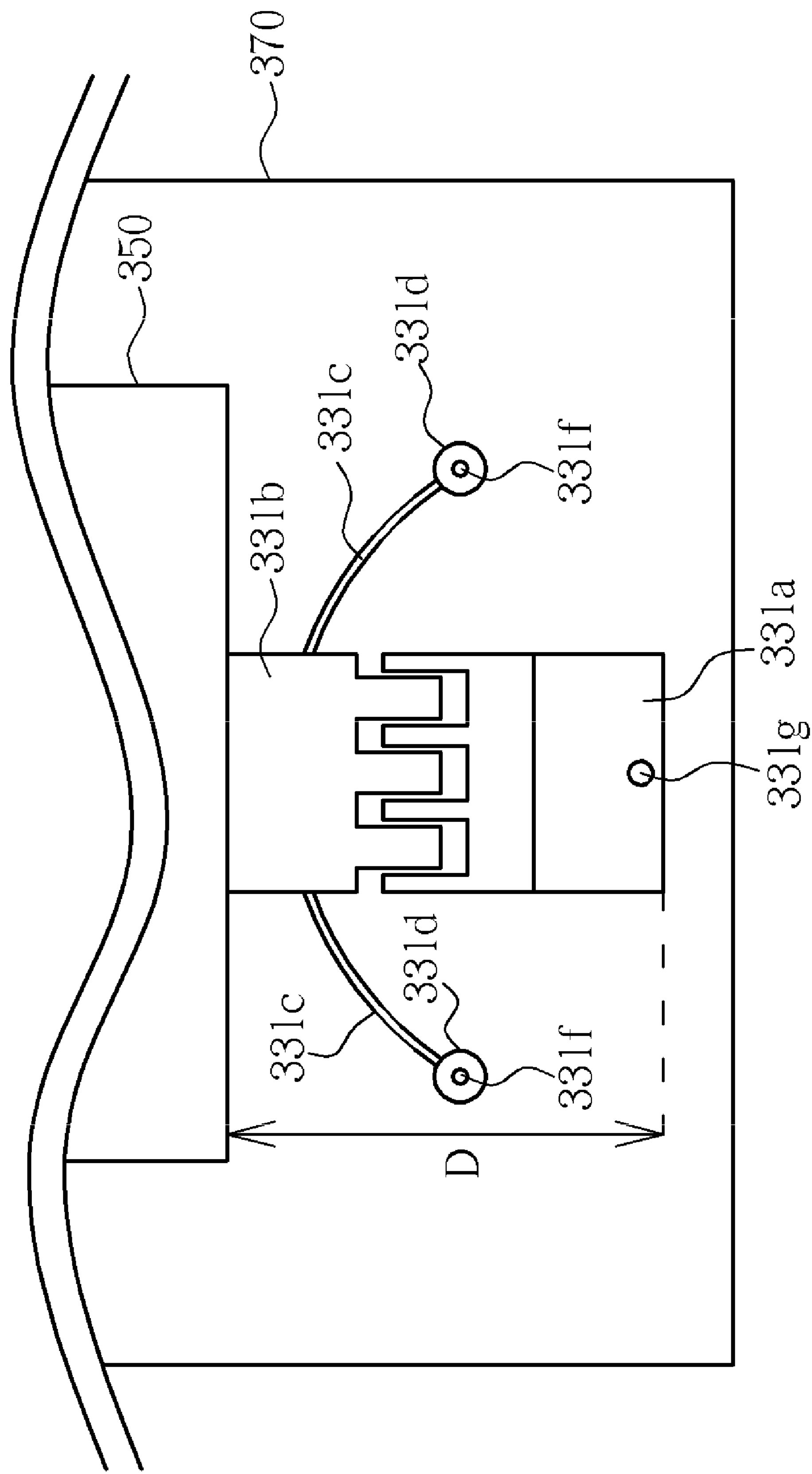
FIG. 8 is a diagram illustrating the electrostatic actuator of the present invention.

Please refer to FIG. 8. FIG. 8 is a diagram illustrating the electrostatic actuator of the present invention. The actuators 331-334 can be realized with the electrostatic actuators shown in FIG. 8. Take the actuator 331 for example. As shown in FIG. 8, the electrostatic actuator 331 comprises a fixed component **331*a* and a moveable component 331*b*. Both of the fixed component 331*a* and the moveable component 331*b* are composed of comb structures, as shown in FIG. 8. The fixed component 331*a* is fixed above the substrate 370 and comprises conducting pad 331*g* so that the actuator control circuit 120 transmits a voltage Va to the conducting pad 331*g* and the voltage Va is received by the fixed component 331*a*. The moveable component 331*b* comprises a flexible suspension 331*c*, an anchor 331*d*, and a conducting pad 331*f*. The anchor 331*d* is fixed above the substrate 370. The conducting pad 331*f* is fixed to the anchor 331*d*. Thus, the actuator control circuit 120 transmits a voltage Vb to the moveable component 331*b* through the conducting pad 331*f* and the flexible suspension 331*c*. Therefore, the electrostatic actuator 331 controls the distance D2 between the moveable component 331*b* and the fixed component 331*a* and thus the distance D is controlled. In this way, the position of the carrier 350 relative to the substrate 370** is controlled.

Figure 16:
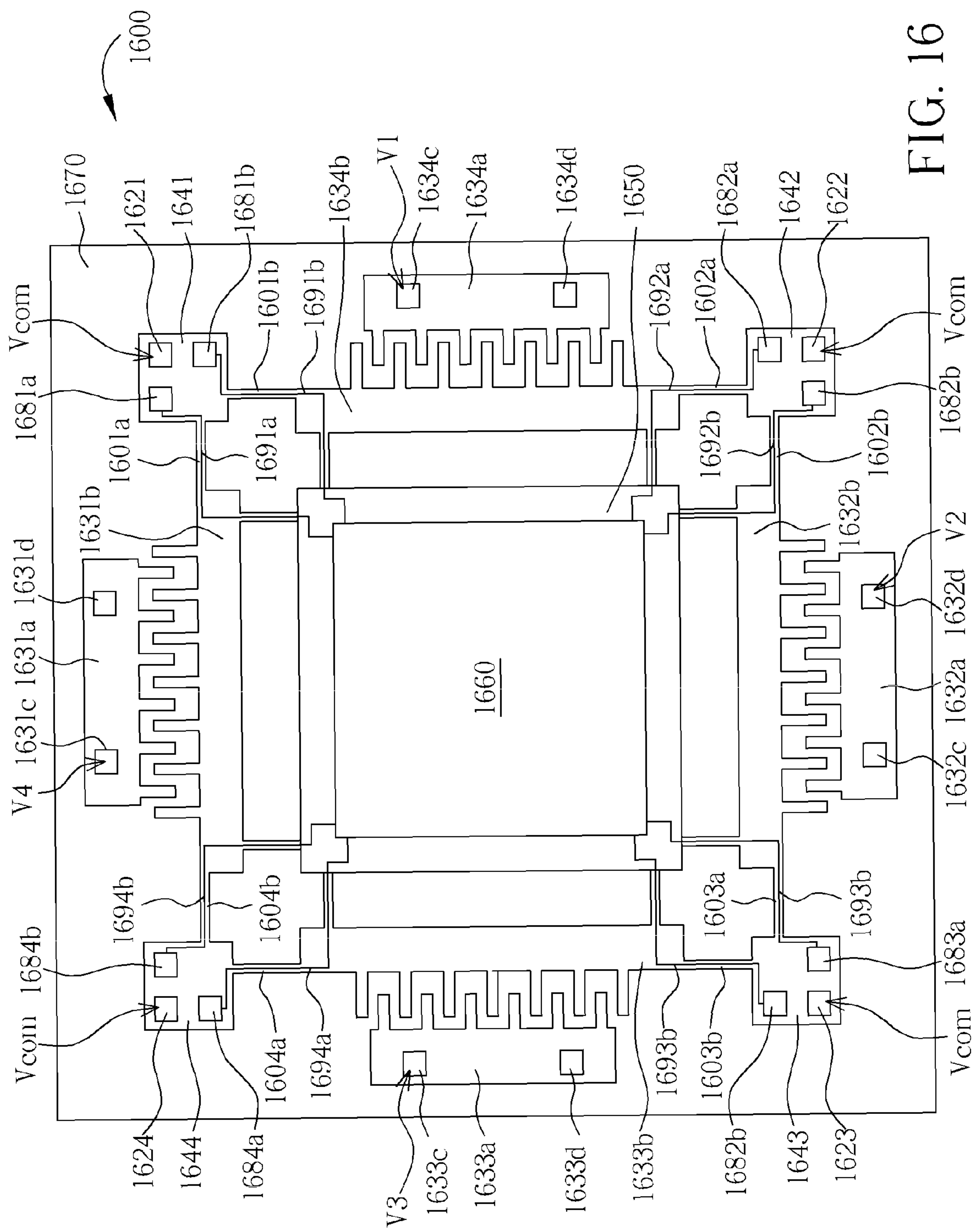
FIG. 16 is a diagram illustrating the micro-electrostatic-actuating image stabilizer of the present invention.

Please refer to FIG. 16. FIG. 16 is a diagram illustrating the micro-electrostatic-actuating image stabilizer 1600 of the present invention. The image stabilizer 1600 utilizes the electrostatic actuator shown in FIG. 8. The image stabilizer 1600 comprises a substrate 1670, a carrier 1650, 4 anchors 1641-1644, 4 conducting pads 1621-1624, 4 conducting pads

1681*a*-1684*a*, 4 conducting pads 1681*b*-1684*b*, fixed components 1631*a*-1634*a*, moveable components 1631*b*-1634*b*, 4 conducting pads 1631*c*-1634*c*, 4 conducting pads 1631*d*-1634*d*, 4 flexible suspensions 1601*a*-1604*a*, 4 flexible suspensions 1601*b*-1604*b*, 4 conducting lines 1691*a*-1694*a*, and 4 conducting lines 1691*b*-1694*b*. The carrier 1650 is disposed for carrying the image sensor 1660 and coupling to the moveable components 1631*b*-1634*b*. The anchors 1641-1644 are fixed above the substrate 1670 and insulated to the substrate 1670 with an insulation layer. The anchors 1641-1644 are utilized for fixing the moveable components 1631*b*-1634*b*. The anchors 1641-1644, the moveable components 1631*b*-1634*b*, the flexible suspensions 1601*a*-1604*a*, and the flexible suspensions 1601*b*-1604*b* are generated from a same layer etched in semiconductor process and all of them are coupled together. Thus, the anchors 1641-1644 are respectively equipped with the conducting pads 1621-1624 for receiving a common voltage Vcom. In this way, the moveable components 1631*b*-1634*b* have a same voltage Vcom. The anchors 1641-1644 are further respectively equipped with conducting pads 1681*a*-1684*a* and 1681*b*-1684*b*. There are insulation layers disposed between the anchors 1641-1644 and the conducting pads 1681*a*-1684*a* and 1681*b*-1684*b* for insulation. The conducting pads 1681*a*-1684*a* and 1681*b*-1684*b* are respectively coupled to the conducting lines 1691*a*-1694*a* and 1691*b*-1694*b* for receiving signals from the image processing circuit and transmitting the received signals to the image sensor 1660 through the conducting lines 1691*a*-1694*a* and 1691*b*-1694*b*. The conducting lines 1691*a*-1694*a* and 1691*b*-1694*b* are disposed by the manner describe above respectively above the flexible suspensions 1601*a*-1604*a* and 1601*b*-1604*b*. There are insulation layers disposed between the conducting lines 1691*a*-1694*a* and 1691*b*-1694*b* and the flexible suspensions 1601*a*-1604*a* and 1601*b*-1604*b* for insulation. The conducting lines 1691*a*-1694*a* and 1691*b*-1694*b* are coupled to the image sensor 1660 by the manner described above (such as tin balls). The fixed components 1631*a*-1634*a* are fixed above the substrate 1670. The conducting pads 1631*c*-1634*c*, and 1631*d*-1634*d* are respectively disposed on the fixed components 1631*a*-1634*a*. The conducting pads 1631*c*-1634*c* are disposed for respectively receiving voltages V1-V4 so that the moveable components 1631*b*-1634*b* respectively have voltages V1-V4. For example, the fixed component 1631*a* has the voltage Vcom and the moveable component 1631*b* has the voltage V1, and the distance between the fixed component 1631*a* and the moveable component 1631*b* are decided by the difference between the voltages Vcom and V1. Therefore, the user can adjust movements of all electrostatic actuators by changing voltages V1-V4. Additionally, the conducting pads 1631*d*-1634*d* are disposed for respectively measuring equivalent capacitances and positions between the fixed and moveable components of the electrostatic actuators.

Figure 9:
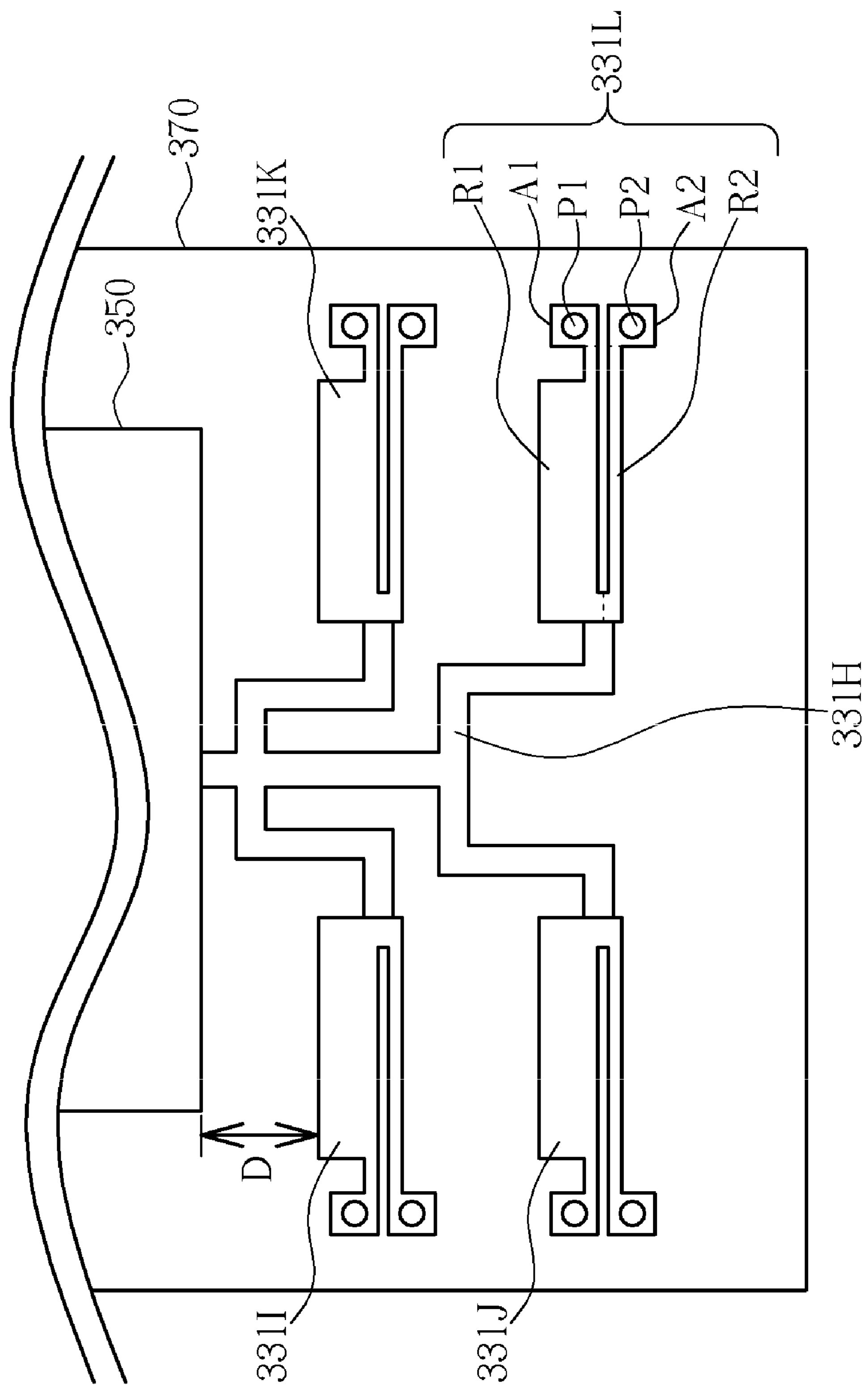
FIG. 9 is a diagram illustrating the thermoelectric actuator of the present invention.

Please refer to FIG. 9. FIG. 9 is a diagram illustrating the thermoelectric actuator of the present invention. The actuators 331-334 can be realized with the thermoelectric actuators shown in FIG. 9. Take the actuator 331 for example. As shown in FIG. 9, the thermoelectric actuator 331 comprises 4 resistance devices 331I, 331J, 331K, and 331L, and a pivot 331H. The structures of the 4 resistance devices 331I-331L are the same and the resistance device 331L is taken as an example. The resistance device 331L comprises two anchors A1 and A2, 2 conducting pads P1 and P2, a high-resistance resistor R2 and a low-resistance resistor R1. The anchors A1 and A2 are fixed above the substrate 370. The conducting pads P1 and P2 are respectively fixed on the anchors A1 and A2. One end of the high-resistance resistor R2 is coupled to the anchor A2 and the other end of the high-resistance resistor R2 is coupled to the low-resistance resistor R1. One end of the low-resistance resistor R1 is coupled to the anchor A1 and the other end of the low-resistance resistor R1 is coupled to the high-resistance resistor R2. The pivot 331H is coupled to the resistors R1 and R2. The resistor R1 has low resistance and the resistor R2 has high resistance. Thus, when a current passes through the high-resistance resistor R2 and the low-resistance resistor R1, the heat energies generated by the resistors R1 and R2 are different and the expansions of the resistors R1 and R2 are different. Therefore, the thermoelectric actuator utilizes the current passing through the resistors R1 and R2 to control the expansions of the resistors R1 and R2, and thus the distance D is controlled. Thus, the actuator control circuit 120 transmits voltages Va and Vb respectively to the conducting pads A1 and A2. The difference between the voltages Va and Vb decides the current passing through the resistors R1 and R2. In this way, the thermoelectric actuator 331 controls the distance D and the position of the carrier 350 relative to the substrate 370 by controlling the difference between the voltages Va and Vb.

Figure 10:
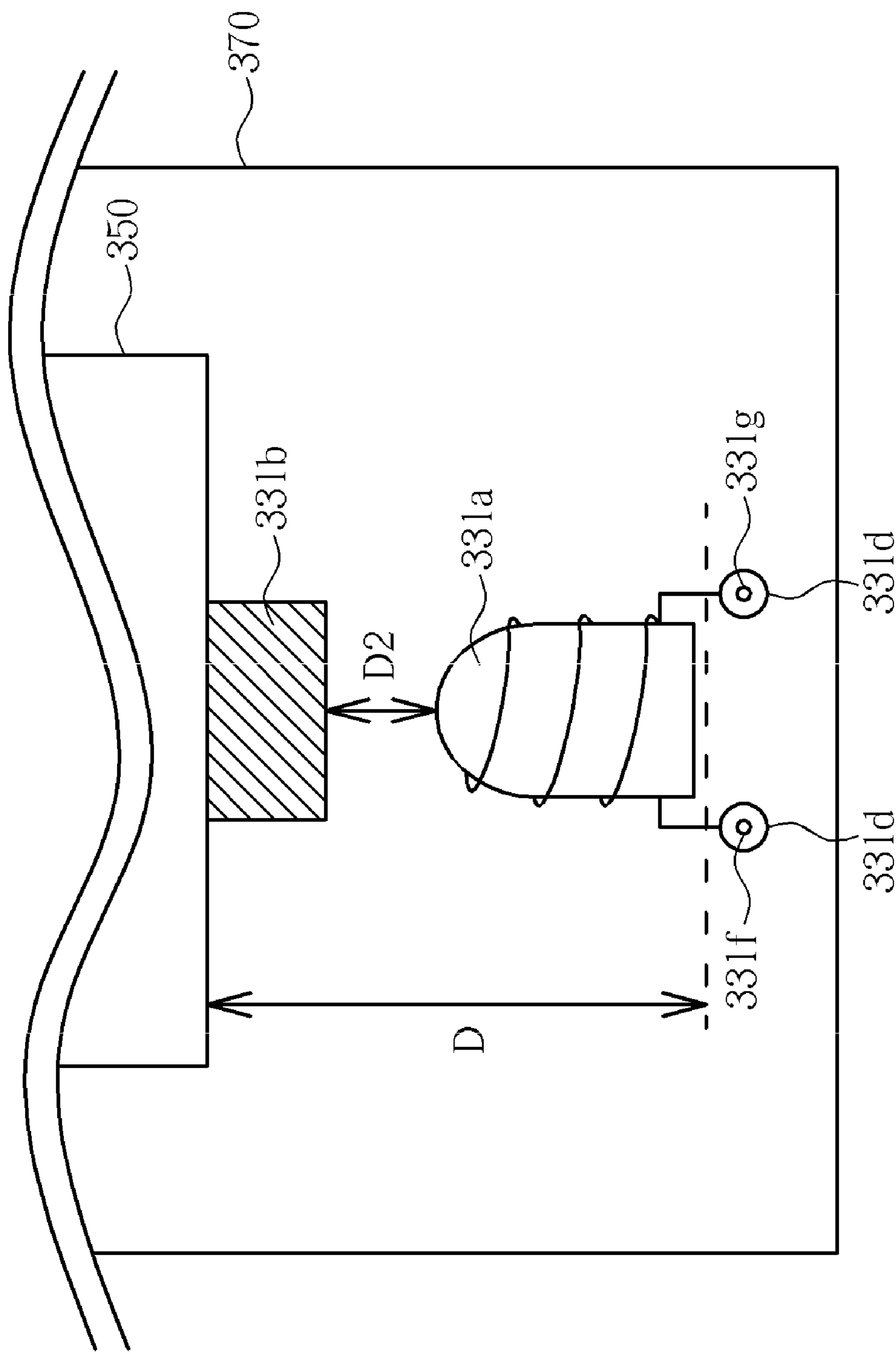
FIG. 10 is a diagram illustrating the electromagnetic actuator of the present invention.

Please refer to FIG. 10. FIG. 10 is a diagram illustrating the electromagnetic actuator of the present invention. The actuators 331-334 can be realized with the electromagnetic actuators shown in FIG. 10. Take the actuator 331 for example. As shown in FIG. 10, the electromagnetic actuator 331 comprises electromagnet 331*a* and magnet 331*b*. The electromagnet 331*a* is fixed above the substrate 370. The magnet 331*b* is fixed to the carrier 350. The electromagnet 331*a* comprises an iron core and a conducting line wound around the iron core, conducting pads 331*g* and 331*f*. One end of the conducting line is coupled to the conducting pad 331*g* and the other end of the conducting line is coupled to the conducting pad 331*f*. Thus, the actuator control circuit 120 controls the current passing through the conducting line by transmitting voltages Va and Vb respectively to the conducting pads 331*g* and 331*f*. The current passing through the conducting line affects the magnet force of the electromagnet 331*a*. When the magnet force rises, the magnet 331*b* is attracted to be close to the electromagnet 331*a*. When the magnet force falls, the magnet 331*b* is attracted to be far from the electromagnet 331*a*. Thus, the electromagnetic actuator 331 controls the distance D2 between the electromagnet 331*a* and the magnet 331*b*. Consequently, the distance D is controlled and the position of the carrier 350 relative to the substrate 370 is controlled.

Figure 11:
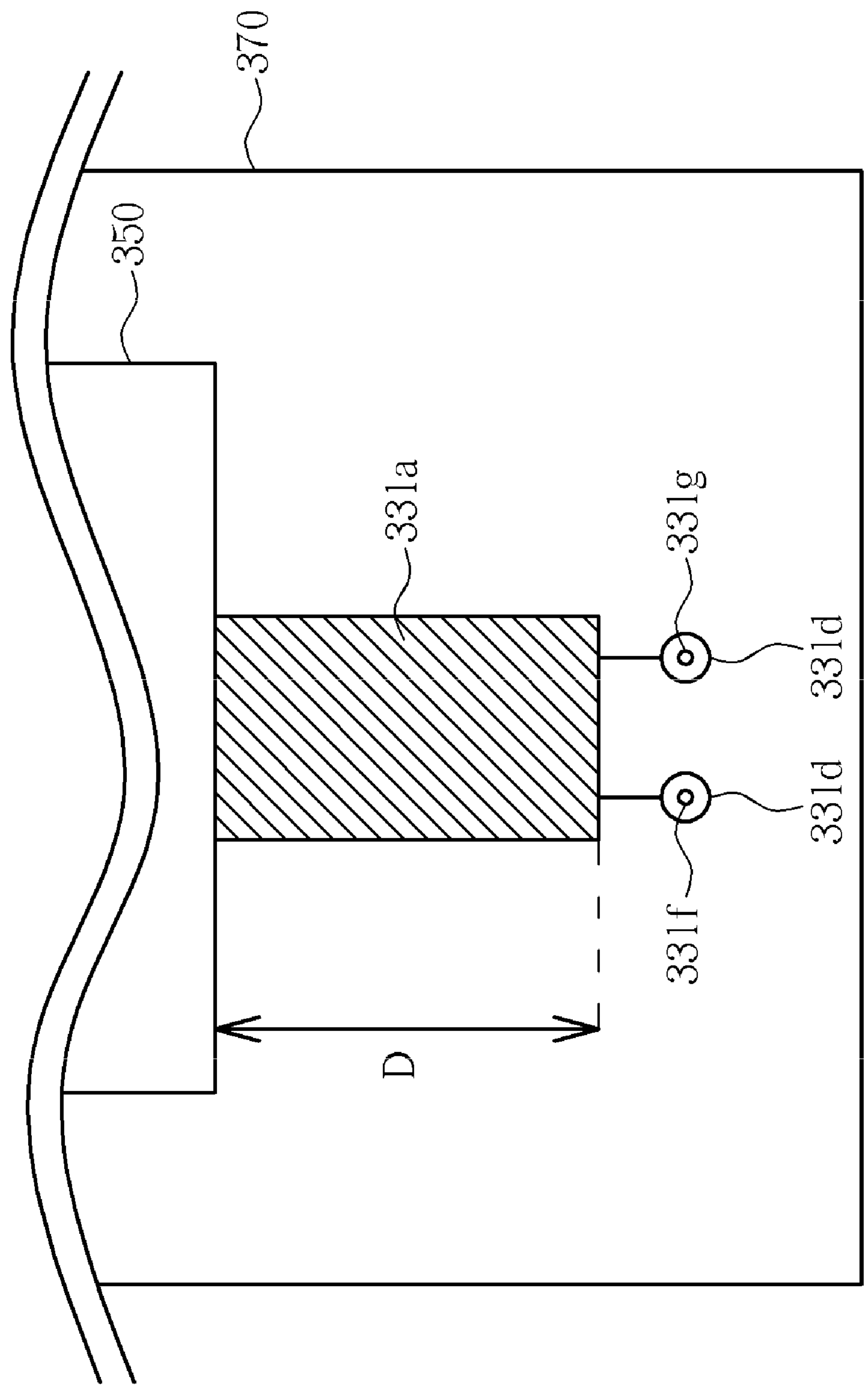
FIG. 11 is a diagram illustrating the piezoelectric actuator of the present invention.

Please refer to FIG. 11. FIG. 11 is a diagram illustrating the piezoelectric actuator of the present invention. The actuators 331-334 can be realized with the piezoelectric actuators shown in FIG. 11. Take the actuator 331 for example. As shown in FIG. 11, the piezoelectric actuator 331 comprises a piezoelectric medium 331*a*, two anchors 331*d*, and two conducting pads 331*f* and 331*g*. One end of the piezoelectric medium 331*a* is fixed above the substrate 370 and the other end of the piezoelectric medium 331*a* is fixed to the carrier 350. The piezoelectric medium can be poly-vinlidence fluoride (PVDF) or lead zirconate titanate (PZT). The characteristic of the piezoelectric medium is to expand when the piezoelectric medium receives voltages and the expansion is proportional to the received voltages. The anchors 331*d* are fixed above the substrate 370. The conducting pads 331*g* and 331*f* are respectively fixed on the anchors 331*d* and coupled to the piezoelectric medium 331*a* through conducting lines. Therefore, the actuator control circuit 120 transmits voltages Va and Vb respectively to the conducting pads 331*g* and 331*f* to control the expansion of the piezoelectric medium 331*a*. The higher voltage the piezoelectric medium 331*a* receives, the bigger expansion it generates, and vice versa. Therefore, the actuator control circuit 120 controls the position of the carrier 350 relative to the substrate 370 by controlling the difference between the voltages Va and Vb.

Figure 17:
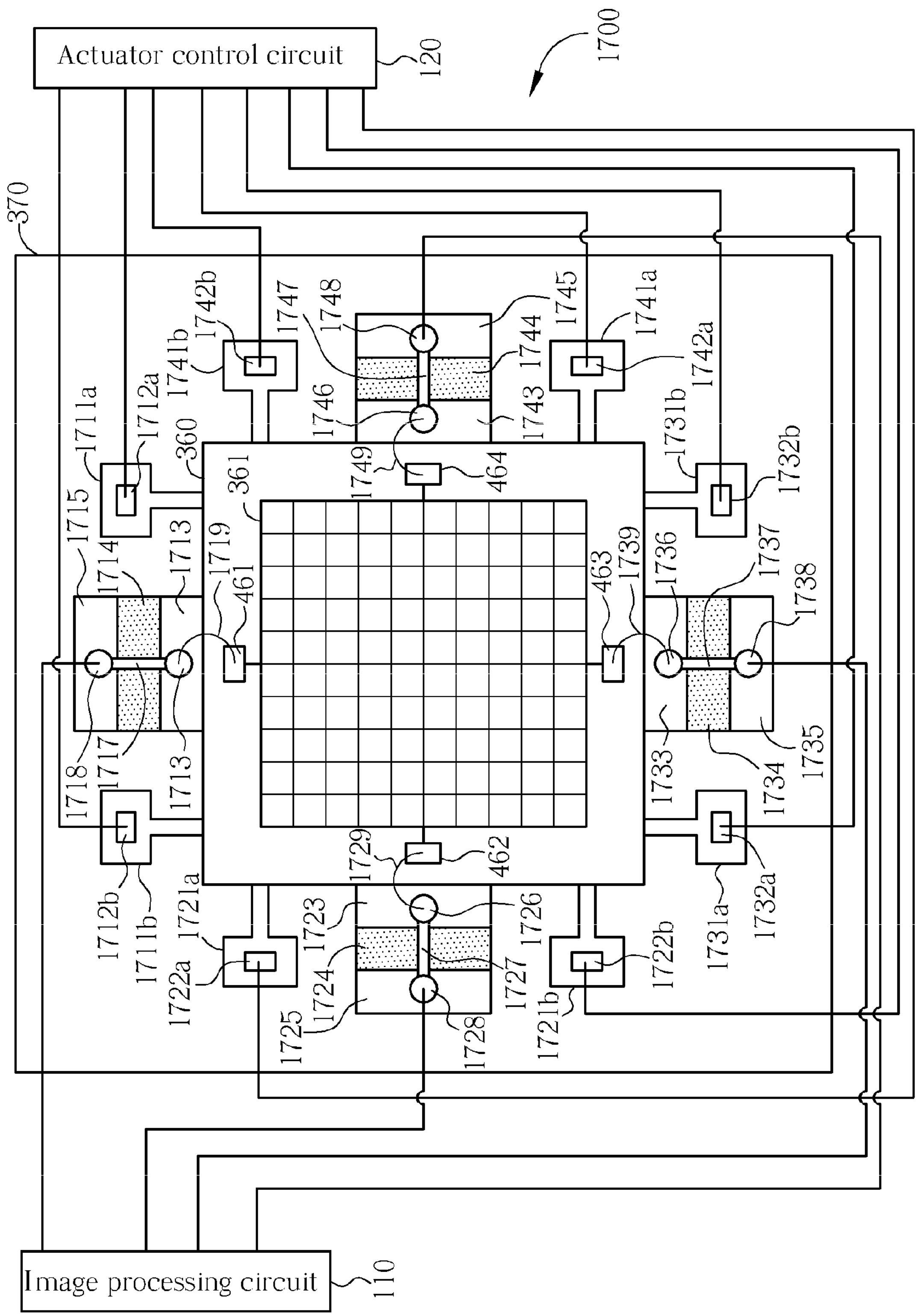
FIG. 17 is a diagram illustrating a third embodiment according to the micro-optical image stabilizer of the present invention.

Please refer to FIG. 17. FIG. 17 is a diagram illustrating a third embodiment according to the micro-optical image stabilizer 1700 of the present invention. FIG. 17 shows the top view of the image stabilizer 1700. As shown in FIG. 17, the image stabilizer 1700 comprises an image processing circuit 110, an actuator control circuit 120, a substrate 370, an image sensor 360, 4 anchors 1711*a*-1741*a*, 4 anchors 1711*b*-1741*b*, 4 conducting pads 1712*a*-1742*a*, 4 conducting pads 1712*b*-1742*b*, 4 anchors 1715-1745, 4 conducting pads 1718-1748, 4 conducting lines 1717-1747, 4 conducting pads 1716-1746, 4 flexible suspensions 1714-1744, 4 connecting arms 1713-1743 (some parts of the connecting arms 1713-1743 are covered by the image sensor 360 and thus not shown in FIG. 17). The image sensor 360 comprises an image sensing area 361 and 4 conducting pads 461-464 coupled to the image sensing area 361 for transmitting image signals. The image stabilizer 1700 further comprises 4 actuators ACT1-ACT4 disposed under the image sensor 360 and a carrier 1850 (since FIG. 17 shows the top view, the actuators ACT1-ACT4 and the carrier 1850 are covered by the image sensor 360 and not shown in FIG. 17). The actuators ACT1-ACT4 may be electrostatic actuators. The connecting arms 1713-1743 are utilized for coupling the image sensor 360 without electrical connection. The carrier 1850 is coupled to the actuators ACT1-ACT4 without electrical connection for carrying the image sensor 360. The actuators ACT1-ACT4 are coupled to the conducting pads 1712*a*-1742*a* and 1712*b*-1742*b* through the anchors 1711*a*-1741*a* and 1711*b*-1741*b*, respectively. The actuator control circuit 120 is coupled to the conducting pads 1712*a*-1742*a* and 1712*b*-1742*b* for controlling the movement of the actuators ACT1-ACT4, respectively, so as to control the position of the carrier 1850 and further control the position of the image sensor 360. The image sensing area 361 is disposed for receiving optical signals of the image and accordingly generating electrical signals. The image processing circuit 110 is coupled to the conducting pads 1718-1748 respectively so that the image processing circuit 110 receives the electrical signals of the image sensing area 361 by the paths constructed with the conducting pads 1718-1748, the conducting lines 1717-1747, the conducting pads 1716-1746, conducting lines 1719-1749 by wire bonding, and the conducting pads 461-464 of the image sensor 360. Because of the disposition of the flexible suspensions 1714-1744, when a relative movement exists between the image sensor 360 and the substrate 370, the electrical signals generated by the image sensor 360 sensing the optical signals for the image can be successfully transmitted to the image processing circuit 110. Therefore, when the substrate 370 is shaken, the actuator control circuit 120 transmits control signals to the actuator ACT1-ACT4 so as to make movement of the carrier 1850 for eliminating effect of the substrate shaking to the image sensor 360. Thus, when the substrate 370 is shaken, the image sensor 360 is not affected by the substrate shaking and the optical signals sensed by the image sensor 360 for the image are stable. Consequently, the image processing circuit 110 generates an stable image. It is noticeable that in the image stabilizer 1700, the paths for signals related to the image sensor and the paths for signals related to the actuators are entirely separated. That is, in the fabrication for the image stabilizer 1700, the paths for signals related to the image sensor and the paths for signals related to the actuators can be separately fabricated, which provides a great convenience. Furthermore, one feature of the present embodiment is that both of the actuators and the carrier are disposed within the vertical projection range of the image sensor. As shown in FIG. 17 (top view), the actuators and the carrier are both completely covered by the image sensor. Such disposition effectively reduces the overall space occupied by the image stabilizer of the present embodiment of the present invention, which provides another great convenience. Additionally, FIG. 17 is only illustrated as an exemplary embodiment, and those skilled in the art can modify the present embodiment according to their requirement, e.g. the positions and amounts of the anchors, conducting pads, conducting lines, and the flexible suspensions, can be modified as desired.

Figure 18:
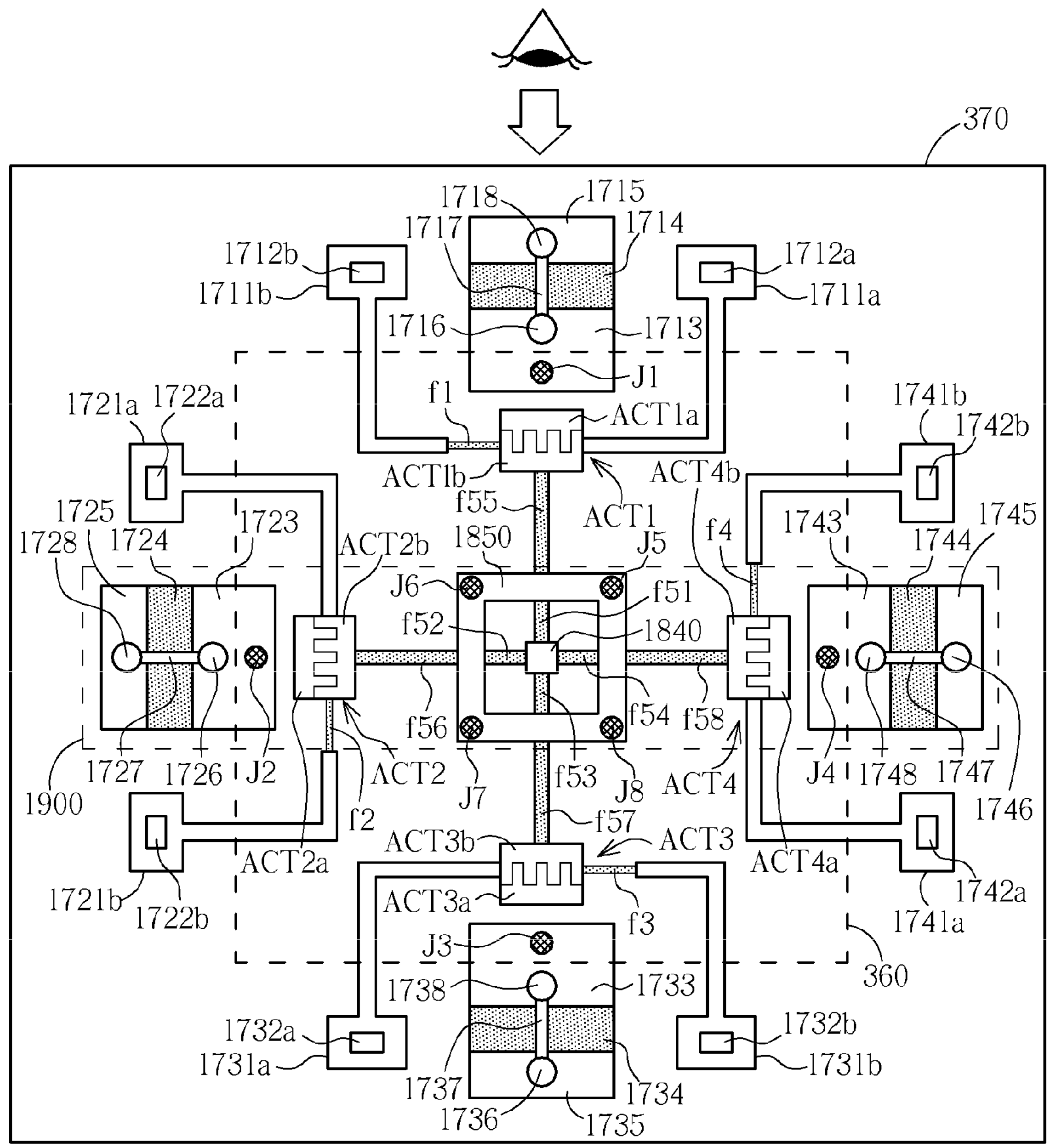
FIG. 18 is a diagram illustrating the image stabilizer according to the third embodiment of the present invention after the image sensor is removed.

Please refer to FIG. 18. FIG. 18 is a diagram illustrating the image stabilizer 1700 according to the third embodiment of the present invention after the image sensor 360 is removed. More particularly, FIG. 18 shows the components of the image stabilizer 1700 under the image sensor 360. As shown in FIG. 18, the components positioned under the image sensor 360 comprises some parts of the connecting arms 1713-1743, the flexible suspensions f1-f4, f55-f58, and f51-f54, the anchors 1840, the nonconductive glue J1-J8, the carrier 1850, and the actuators ACT1-ACT4. The actuators ACT1-ACT4 respectively comprises fixed components ACT1*a*-ACT4*a* and moveable components ACT1*b*-ACT4*b*. The fixed components ACT1*a*-ACT4*a* are respectively coupled to the anchors 1711*a*-1741*a* for receiving the voltages V1*a*-V4*a* transmitted from the actuator control circuit 120 through the conducting pads 1712*a*-1742*a*. The moveable components ACT1*b*-ACT4*b* are respectively coupled to the anchors 1711*b*-1741*b* through the flexible suspensions f1-f4 for receiving the voltage V1*b*-V4*b* transmitted from the actuator control circuit 120 through the conducting pads 1712*b*-1742*b*. The actuators ACT1-ACT4 adjust the position of the carrier 1850 relative to the substrate 370 respectively according to the differences between the voltages V1*a*-V4*a* and V1*b*-V4*b*, and further adjust the position of the image sensor 360 relative to the substrate 370. The carrier 1850 is coupled between the actuators ACT1-ACT4 and the anchor 1840 through the flexible suspensions f51-f58, and the image sensor 360 is attached to the carrier 1850 with the nonconductive glues J5-J8. The disposition of the flexible suspensions f51-f58 is for buffering and enhancing the stability of the carrier 1850, and the related design can be made as desired. Some parts of the connecting arms 1713-1743 positioned under the image sensor 360 are equipped with nonconductive glues J1-J4 for the image sensor 360 being attached to the connecting arms 1713-1743. In this way, the actuators ACT1-ACT4 controls the carrier 1850 for moving the image sensor 360, and the electrical signals generated from the image sensor 360 for the sensed image are still able to be transmitted to the image processing circuit 110 through the flexible suspensions 1714-1744 through the related conducting pads and the related conducting lines even when the image sensor 360 is moved. Therefore, the movement of the image sensor 360 controlled by the actuators ACT1-ACT4 does not affect the electrical signals transmitted from the image sensor 360, which provides great convenience.

Figure 19:
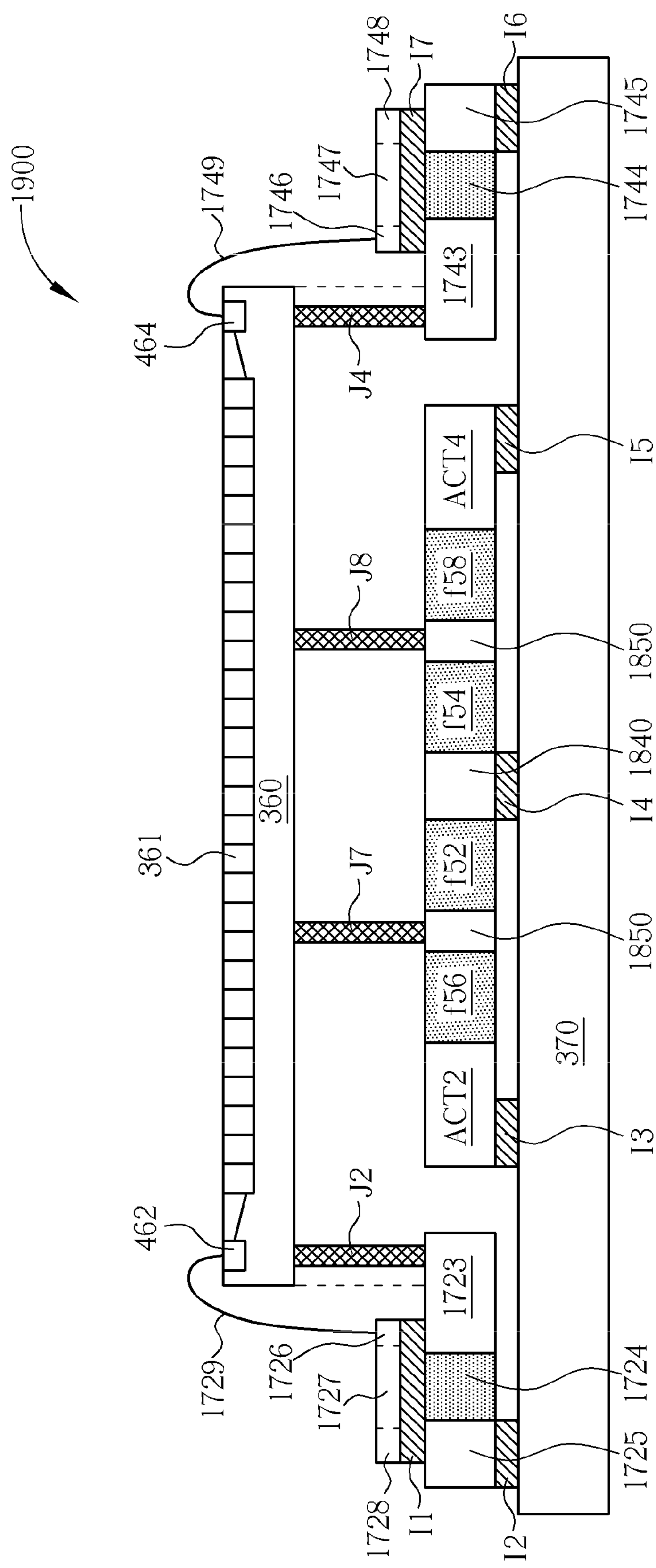
FIG. 19 is a diagram illustrating the third embodiment of the image stabilizer of the present invention fabricated by wire bonding.

Please refer to FIG. 19. FIG. 19 is a diagram illustrating the third embodiment of the image stabilizer 1700 of the present invention fabricated by wire bonding. The cross-section shown in FIG. 19 is the cross-section as the indication 1900 shown in FIG. 18. In FIG. 19, the anchors 1725 and 1745 are fixed above the substrate 370 respectively through an insulation layer 12 and 16 for ensuring insulation. The flexible suspension 1724 is coupled between the connecting arm 1723 and the anchor 1725. The flexible suspension 1744 is coupled between the connecting arm 1743 and the anchor 1745. The conducting pads 1728 and 1726, and the conducting line 1727 are fixed above the anchor 1725, the flexible suspension 1724 and the connecting arm 1723 through an insulation layer I1 for ensuring insulation. The conducting pads 1748 and 1746, and the conducting line 1747 are fixed above the anchor 1745, the flexible suspension 1744 and the connecting arm 1743 through an insulation layer 17 for ensuring insulation. The connecting arm 1723 is attached to the image sensor 360 through the nonconductive glue J2. The connecting arm 1743 is attached to the image sensor 360 through the nonconductive glue J4. The image sensor 360 is equipped with conducting pads 462 and 464 around the image sensing area 361 for coupling to the conducting pads 1726 and 1746. The conducting lines 1729 and 1749 are coupled to the conducting pads 1726 and 1746 by wire bonding. The wire bonding technology comprises many methods, which is well known by the skilled in the art, and is omitted. The actuator ACT2 is fixed above the substrate 370 through an isolation layer 13 for ensuring isolation. The flexible suspension f56 is coupled between the actuator ACT2 and the carrier 1850. The flexible suspension f52 is coupled between the carrier 1850 and the anchor 1840. The anchor 1840 is fixed above the substrate 370 through an isolation layer 14 for ensuring isolation. The actuator ACT4 is fixed above the substrate 370 through an isolation layer I5 for ensuring isolation. The flexible suspension f58 is coupled between the actuator ACT4 and the carrier 1850. The flexible suspension f54 is coupled between the carrier 1850 and the anchor 1840. The image sensor 360 is attached above the carrier 1850 through the nonconductive glues J7 and J8. In this way, the image processing circuit 110, after the fabrication of the image sensor 360, can be coupled to the image sensing area 361 through (1) the conducting pad 1728, the conducting line 1727, the conducting pad 1726, the conducting line 1729, and the conducting pad 462, and (2) the conducting pad 1748, the conducting line 1747, the conducting pad 1746, the conducting line 1749, and the conducting pad 464, for receiving the electrical signals transmitted from the image sensor 360.

Figure 20:
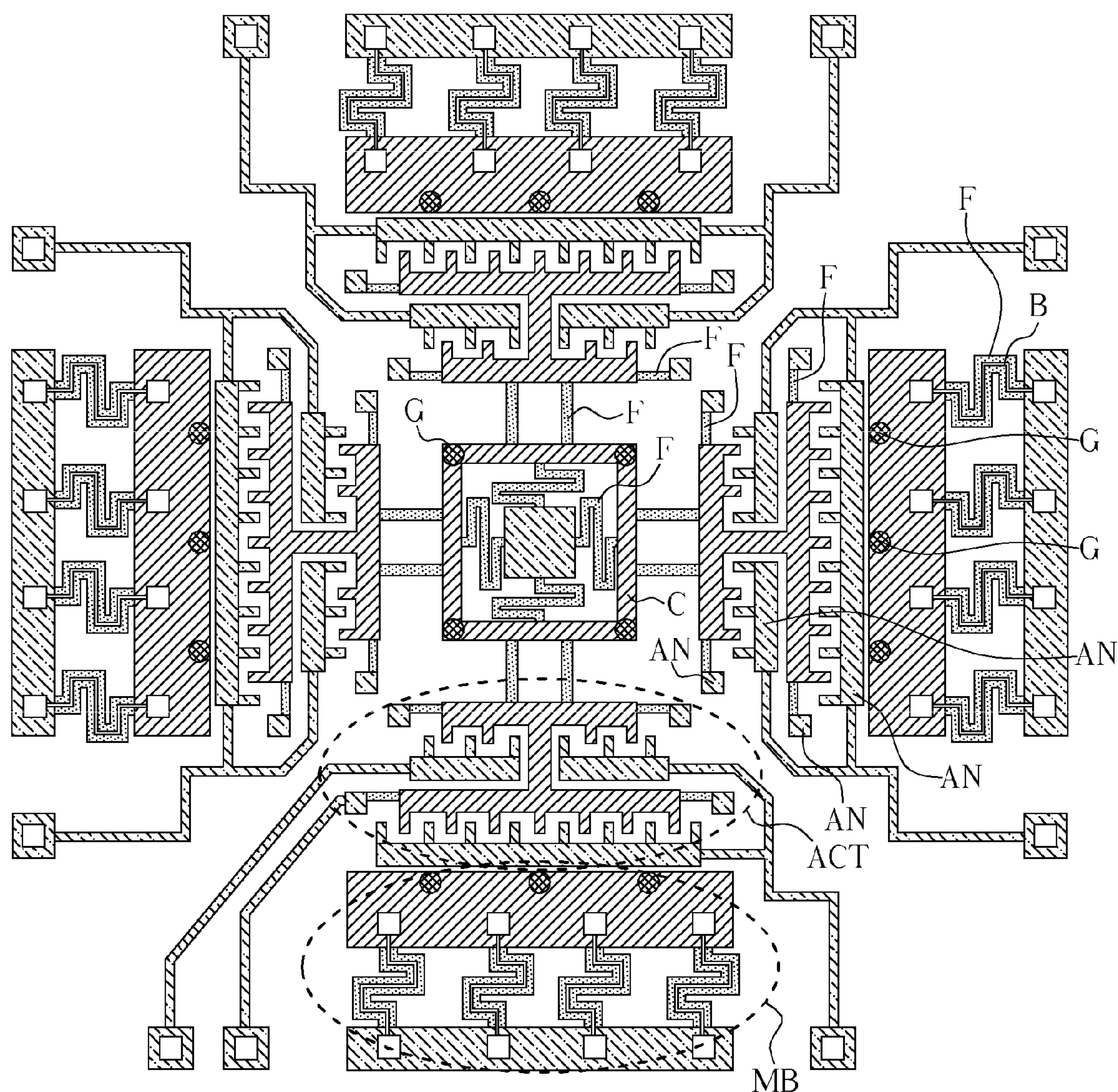
FIG. 20 is a diagram illustrating the layout of the image stabilizer according to the third embodiment of the present invention.

Please refer to FIG. 20. FIG. 20 is a diagram illustrating the layout of the image stabilizer 1700 according to the third embodiment of the present invention. Users can utilize the layout disclosed in FIG. 20 to realize the image stabilizer 1700. In FIG. 20, B represents the conducting line, G represents the nonconductive glue, AN represents the anchor, C represents the carrier, ACT represents the actuator, and MB represents the micro-bus. The micro-bus can be the above-mentioned conducting line, conducting pad, flexible suspension, and connecting arm. It is noticeable that in FIG. 20, the moveable components of the four actuators are applied with the same voltage. That is, the parts of the moveable components of the four actuators for receiving the control voltages are coupled together. In this way, only the voltages applied respectively for the fixed components of the four actuators have to be controlled so as to control the movements of the four actuators and achieve the purpose of stabilizing the image sensor.

Furthermore, although the image stabilizer 1700 of the present invention is only illustrated with wire bonding technology, however, users are still able to realize the image stabilizer 1700 according to the flip chip bonding technology disclosed in the present invention, which is described above and will not be repeated again for brevity.

Additionally, the substrate mentioned in the present invention can be a glass substrate. The anchors, flexible suspensions, the connecting arms, and the actuators mentioned in the present invention can be generated by etching the silicon layer covering on the substrate.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A micro-optical image stabilizer coupled to an image processing circuit and an actuator control circuit for stabilizing an image sensor, the micro-optical image stabilizer comprising:

a substrate;

a carrier moveably arranged on the substrate for carrying the image sensor;

at least one pair of flexible coupling members arranged correspondingly around the carrier, each flexible coupling member including:

a first anchor fixedly disposed on the substrate, a connecting arm supportively coupled to the image sensor, a flexible suspension connecting the first anchor and the connecting arm;

wherein the flexible coupling members jointly flexibly hold the image sensor at a default position with respect to the substrate;

at least one conducting member arranged on at least one of the flexible coupling member, each conducting member including:

a first conducting pad fixedly arranged on the first anchor for establishing signal communication with the image processing circuit, a second conducting pad fixedly arranged on the connecting arm and signal communicatively coupled to the image sensor, a conducting line signal communicatively connecting the first conducting pad and the second conduction pad; and at least one micro-actuator fixedly disposed on the substrate and manipulatably coupled to the carrier for adjusting the position of the carrier relative to the substrate according to control signals of the actuator control circuit.

2. The micro-optical image stabilizer of claim 1, wherein the micro-actuator and the carrier are at least partially positioned within vertical projection range of the image sensor.

3. The micro-optical image stabilizer of claim 1, wherein the micro-actuator surrounds the carrier.

4. The micro-optical image stabilizer of claim 1, wherein the connecting arm is coupled to the image sensor through a nonconductive glue without electrical connection, and wherein the conducting line is disposed on the flexible suspension.

5. The micro-optical image stabilizer of claim 1, further comprising a second anchor disposed at center of the carrier, and the second anchor being coupled to the carrier through at least one first flexible coupler without electrical connection for stabilizing the carrier.

6. The micro-optical image stabilizer of claim 5, wherein the carrier is coupled to the image sensor without electrical connection through a nonconductive glue.

7. The micro-optical image stabilizer of claim 1, wherein the micro-actuator is coupled to the carrier without electrical connection through at least one second flexible coupler.

8. The micro-optical image stabilizer of claim 1, further comprising the image sensor, wherein the image sensor comprises:

an image sensing area; and a third conducting pad coupled to the image sensing area for electrically coupling to the second conducting pad.

9. The micro-optical image stabilizer of claim 8, wherein the third conducting pad of the image sensor is electrically coupled to the second conducting pad with flip chip or wire bonding techniques.

10. The micro-optical image stabilizer of claim 8, wherein the image sensing area of the image sensor is of a direction from the substrate to the carrier.

11. The micro-optical image stabilizer of claim 8, wherein the image sensing area of the image sensor is of a direction from the carrier to the substrate.

12. The micro-optical image stabilizer of claim 11, wherein the carrier comprises a hole positioned for the image sensing area, and the substrate comprises a hole positioned for the image sensing area.

13. The micro-optical image stabilizer of claim 1, further comprising a first isolation layer disposed between the substrate and the first anchor.

14. The micro-optical image stabilizer of claim 13, further comprising a second isolation layer disposed between the flexible suspension and the conducting line, and the first conducting pad and the second conducting pad.

15. The micro-optical image stabilizer of claim 1, wherein the micro-actuator is a micro-electrostatic actuator, and the micro-electrostatic actuator comprises:

a fixed component having a comb structure fixed on the substrate comprising a first conducting sub-pad coupled to the actuator controlling circuit for receiving a first voltage;

a sub-anchor fixed on the substrate;

a flexible sub-suspension coupled to the sub-anchor of the micro-electrostatic actuator;

a second conducting sub-pad fixed on the sub-anchor for coupling to the actuator controlling circuit to receive a second voltage and transmit the second voltage to the flexible sub-suspension;

a moveable component having a comb structure fixed on the carrier coupled to the flexible sub-suspension for receiving the second voltage;

wherein a distance between the fixed component and the moveable component is decided by difference of the first voltage and the second voltage.

16. The micro-optical image stabilizer of claim 1, wherein the micro-actuator is a micro-electromagnetic actuator, and the micro-electromagnetic actuator comprises:

a first sub-anchor having a first sub-conducting pad coupled to the actuator control circuit for receiving a first voltage;

a second sub-anchor having a second sub-conducting pad coupled to the actuator control circuit for receiving a second voltage;

a magnet fixed on the carrier; and an electromagnet fixed on the substrate comprising:

an iron core; and a conducting line wound around the iron core coupled between the first sub-conducting pad and the second sub-conducting pad for receiving the first voltage and the second voltage;

wherein a distance between the magnet and the electromagnet is decided by difference between the first voltage and the second voltage.

17. The micro-optical image stabilizer of claim 1, wherein the micro-actuator is a micro-piezoelectric actuator, and the micro-piezoelectric actuator comprises:

a first sub-anchor having a first sub-conducting pad coupled to the actuator control circuit for receiving a first voltage;

a second sub-anchor having a second sub-conducting pad coupled to the actuator control circuit for receiving a second voltage; and a piezoelectric medium comprising a first end and a second end, the first end fixed on the carrier, and the second end fixed on the substrate coupled to the first sub-conducting pad and the second sub-conducting pad for receiving the first voltage and the second voltage;

wherein appearance of the piezoelectric medium changes when the piezoelectric medium receives the first voltage and the second voltage, and position of the carrier relative to the substrate is decided by difference between the first voltage and the second voltage.

18. The micro-optical image stabilizer of claim 1, wherein the micro-actuator is a micro-thermoelectric actuator, and the micro-thermoelectric actuator comprises:

a first sub-anchor having a first sub-conducting pad coupled to the actuator control circuit for receiving a first voltage;

a second sub-anchor having a second sub-conducting pad coupled to the actuator control circuit for receiving a second voltage;

a pivot disposed on the carrier;

a low-resistance resistor comprising a first end and a second end, the first end fixed on the substrate and coupled to the first sub-conducting pad for receiving the first voltage, and the second end fixed on the pivot; and a high-resistance resistor comprising a first end and a second end, the first end fixed on the substrate and coupled to the second sub-conducting pad for receiving the second voltage, and the second end fixed on the pivot coupled to the second end of the low-resistance resistor;

wherein temperature of the low-resistance resistor changes when the low-resistance resistor receives the first voltage;

wherein temperature of the low-resistance resistor changes when the high-resistance resistor receives the second voltage;

wherein position of the carrier relative to the substrate is decided by difference between the first and the second voltages.

19. The micro-optical image stabilizer of claim 1, wherein the substrate is a glass substrate, and the first anchor, the flexible suspension, and the micro-actuator are formed by etching thin silicon film covering on the substrate.

20. The micro-optical image stabilizer of claim 1, wherein the micro-actuator is disposed at least partially between the substrate and the image sensor.

* * * * *